US011795281B2

(12) United States Patent
Jiang et al.

(10) Patent No.: US 11,795,281 B2
(45) Date of Patent: *Oct. 24, 2023

(54) METHODS AND COMPOSITIONS RELATING TO TUNABLE NANOPOROUS COATINGS

(71) Applicant: University of Florida Research Foundation, Inc., Gainesville, FL (US)

(72) Inventors: Peng Jiang, Gainesville, FL (US); Sin-Yen Leo, Hillsboro, OR (US); Calen Leverant, Gainesville, FL (US); Danielle Liu, Nashville, TN (US); Yin Fang, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 220 days.

This patent is subject to a terminal disclaimer.

(21) Appl. No.: 17/230,160

(22) Filed: Apr. 14, 2021

(65) Prior Publication Data

US 2021/0253811 A1 Aug. 19, 2021

Related U.S. Application Data

(63) Continuation of application No. 16/277,579, filed on Feb. 15, 2019, now Pat. No. 11,008,429, which is a continuation-in-part of application No. PCT/US2017/046886, filed on Aug. 15, 2017.

(60) Provisional application No. 62/375,172, filed on Aug. 15, 2016.

(51) Int. Cl.
| | |
|---|---|
| *C08J 5/18* | (2006.01) |
| *B01D 69/12* | (2006.01) |
| *C08F 22/10* | (2006.01) |
| *G02B 5/02* | (2006.01) |
| *G02B 1/111* | (2015.01) |
| *C08J 7/02* | (2006.01) |
| *B01D 71/40* | (2006.01) |

(52) U.S. Cl.
CPC .............. *C08J 5/18* (2013.01); *B01D 69/125* (2013.01); *C08F 22/1006* (2020.02); *C08J 7/02* (2013.01); *G02B 1/111* (2013.01); *G02B 5/0247* (2013.01); *G02B 5/0268* (2013.01); *G02B 5/0294* (2013.01); *B01D 71/40* (2013.01); *B01D 2321/18* (2013.01); *B01D 2323/24* (2013.01); *C08J 2335/02* (2013.01)

(58) Field of Classification Search
CPC .. B01D 69/125; B01D 71/40; B01D 2321/18; B01D 2323/24; C08J 5/18; C08J 7/02; C08J 2335/02; C08F 22/1006; G02B 5/0294; G02B 5/0247; G02B 5/0268; G02B 1/111
See application file for complete search history.

(56) References Cited

U.S. PATENT DOCUMENTS

| | | | |
|---|---|---|---|
| 3,422,535 A | 1/1969 | Johnson | |
| 3,671,105 A | 6/1972 | Williams et al. | |
| 4,125,319 A | 11/1978 | Frank et al. | |
| 4,340,479 A | 7/1982 | Pall | |
| 4,664,748 A | 5/1987 | Ueno et al. | |
| 4,781,441 A | 11/1988 | Kanbe et al. | |
| 4,810,633 A | 3/1989 | Bauer et al. | |
| 5,147,716 A | 9/1992 | Bellus | |
| 5,337,018 A | 8/1994 | Yamagishi | |
| 5,429,743 A | 7/1995 | Geus et al. | |
| 5,529,524 A | 6/1996 | Jones | |
| 5,641,332 A | 6/1997 | Faber et al. | |
| 5,753,014 A | 5/1998 | Van Rijn | |
| 5,939,189 A | 8/1999 | Phillips et al. | |
| 5,948,470 A | 9/1999 | Harrison et al. | |
| 5,993,661 A | 11/1999 | Ruckenstein et al. | |
| 6,044,981 A | 4/2000 | Chu et al. | |
| 6,531,304 B1 | 3/2003 | Boennemann et al. | |
| 6,565,763 B1 | 5/2003 | Asakawa et al. | |
| 6,649,255 B1 | 11/2003 | Fain et al. | |
| 6,881,582 B2 | 4/2005 | Ratogi et al. | |
| 6,929,764 B2 | 8/2005 | Jiang et al. | |
| 6,958,137 B2 | 10/2005 | Lee et al. | |
| 7,351,470 B2 | 4/2008 | Draheim et al. | |
| 7,630,589 B2 | 12/2009 | Kilic et al. | |
| 7,691,325 B2 | 4/2010 | Chopra et al. | |
| 7,889,954 B2 | 2/2011 | Sailor et al. | |

(Continued)

FOREIGN PATENT DOCUMENTS

| | | |
|---|---|---|
| CN | 103935057 A | 7/2014 |
| CN | 105036068 A | 11/2015 |

(Continued)

OTHER PUBLICATIONS

E. Metwalli, D.; et al. "Surface characterizations of mono-, di-, and tri-, aminosilane treated glass substrates", J. Colloid nterf. Sci. 298 (2006) 825-831.

Esquivel-Upshaw, J. F., et al. "Surface degradation of dental ceramics as a function of environmental pH." Journal of Tental research 92.5 (2013): 467-471.

Esquivel-Upshaw, Josephine F., et al. "In Vivo Wear of Enamel by a Lithia Disilicate-Based Core Ceramic Used for Posterior Fixed Partial Dentures: First-Year Results." International Journal of Prosthodontics 19.4 (2006).

(Continued)

*Primary Examiner* — Patrick D Niland
(74) *Attorney, Agent, or Firm* — Thomas Horstemeyer LLP

(57) ABSTRACT

Described herein are methods and compositions relating to tunable nanoporous coatings. In certain aspects, described herein are methods and compositions wherein a tunable nanoporous coating comprises a tunable nanoporous membrane which transitions from opaque to transparent upon the application of force, and from transparent to opaque after washing with a solvent.

10 Claims, 17 Drawing Sheets

(56) References Cited

U.S. PATENT DOCUMENTS

| | | |
|---|---|---|
| 9,233,883 B1 | 1/2016 | Rauscher et al. |
| 9,272,947 B2 | 3/2016 | Baca et al. |
| 10,189,967 B2 | 1/2019 | Jiang et al. |
| 10,700,225 B2 | 6/2020 | Wang et al. |
| 11,008,429 B2 * | 5/2021 | Jiang .................. G02B 1/111 |
| 2003/0031438 A1 | 2/2003 | Kambe et al. |
| 2004/0131779 A1 | 7/2004 | Haubrich et al. |
| 2004/0131799 A1 | 7/2004 | Arsenault et al. |
| 2004/0184948 A1 | 9/2004 | Rakow et al. |
| 2005/0147807 A1 | 7/2005 | Haas et al. |
| 2006/0137462 A1 | 6/2006 | Divigalpitiya et al. |
| 2007/0036653 A1 | 2/2007 | Bak et al. |
| 2007/0156079 A1 | 7/2007 | Brown |
| 2007/0206270 A1 | 9/2007 | Iwamatsu et al. |
| 2008/0006574 A1 | 1/2008 | Ramaswamy et al. |
| 2008/0027199 A1 | 1/2008 | Mazurek et al. |
| 2008/0108142 A1 | 5/2008 | Hall et al. |
| 2008/0185498 A1 | 8/2008 | Purdy et al. |
| 2008/0233418 A1 | 9/2008 | Krueger |
| 2008/0309923 A1 | 12/2008 | Falk |
| 2009/0034051 A1 | 2/2009 | Arsenault et al. |
| 2009/0274873 A1 | 11/2009 | Shinotsuka |
| 2010/0051561 A1 | 3/2010 | Lee |
| 2010/0058844 A1 | 3/2010 | Lin et al. |
| 2010/0068168 A1 | 3/2010 | Song et al. |
| 2010/0069726 A1 | 3/2010 | Levinson |
| 2010/0125113 A1 | 5/2010 | Xiao et al. |
| 2010/0150511 A1 | 6/2010 | Arsenault et al. |
| 2010/0155325 A1 | 6/2010 | Zhang et al. |
| 2010/0188732 A1 | 7/2010 | Akashi et al. |
| 2010/0216310 A1 | 8/2010 | Metz et al. |
| 2010/0218716 A1 | 9/2010 | Havens et al. |
| 2010/0235107 A1 | 9/2010 | Fukumura et al. |
| 2010/0244169 A1 | 9/2010 | Maeda et al. |
| 2010/0315703 A1 | 12/2010 | Purdy et al. |
| 2011/0019277 A1 | 1/2011 | Sager |
| 2011/0097814 A1 | 4/2011 | Bommarito et al. |
| 2011/0111173 A1 | 5/2011 | Ogawa et al. |
| 2011/0140106 A1 | 6/2011 | Forbes |
| 2011/0194261 A1 | 8/2011 | Tanaka et al. |
| 2011/0233476 A1 | 9/2011 | Arsenault |
| 2011/0255035 A1 | 10/2011 | Wu |
| 2012/0051489 A1 | 3/2012 | Varanasi et al. |
| 2012/0073388 A1 | 3/2012 | Chibante |
| 2012/0074612 A1 | 3/2012 | Scrivens et al. |
| 2012/0152338 A1 | 6/2012 | Ha et al. |
| 2012/0225517 A1 | 9/2012 | Zhang et al. |
| 2012/0262789 A1 | 10/2012 | Xie et al. |
| 2012/0281292 A1 | 11/2012 | Baca et al. |
| 2012/0293802 A1 | 11/2012 | Dzin et al. |
| 2012/0313205 A1 | 12/2012 | Haddad et al. |
| 2012/0321810 A1 | 12/2012 | Tebby et al. |
| 2013/0078750 A1 | 3/2013 | Yeo et al. |
| 2013/0199995 A1 | 8/2013 | Jiang et al. |
| 2013/0215513 A1 | 8/2013 | Liang et al. |
| 2013/0222881 A1 | 8/2013 | Aizenberg et al. |
| 2013/0258483 A1 | 10/2013 | Pett et al. |
| 2013/0320467 A1 | 12/2013 | Buchanan et al. |
| 2013/0340824 A1 | 12/2013 | Oh et al. |
| 2014/0017145 A1 | 1/2014 | Mzenberg et al. |
| 2014/0106468 A1 | 4/2014 | Boersma |
| 2014/0166100 A1 | 6/2014 | Watanabe et al. |
| 2014/0319524 A1 | 10/2014 | Phillips et al. |
| 2015/0035269 A1 | 2/2015 | Hooper et al. |
| 2015/0276989 A1 | 3/2015 | Han et al. |
| 2015/0157453 A1 | 6/2015 | Nazirizadeh et al. |
| 2016/0032141 A1 | 2/2016 | Maghsoodi et al. |
| 2016/0254395 A1 | 9/2016 | Jiang et al. |
| 2016/0326334 A1 | 11/2016 | Jiang et al. |
| 2017/0209045 A1 | 7/2017 | Choo et al. |
| 2017/0215790 A1 | 8/2017 | Levinson et al. |
| 2017/0225395 A1 | 8/2017 | Boydston et al. |
| 2017/0271259 A1 | 9/2017 | Hotta et al. |

FOREIGN PATENT DOCUMENTS

| | | |
|---|---|---|
| EP | 0341675 A2 | 11/1989 |
| EP | 2220520 A2 | 8/2010 |
| WO | 9820388 A1 | 5/1998 |
| WO | 1998020388 A1 | 5/1998 |
| WO | 2000010934 A1 | 3/2000 |
| WO | 02073699 A3 | 11/2002 |
| WO | 2007070486 A2 | 6/2007 |
| WO | 2008060322 A2 | 5/2008 |
| WO | 2010007853 A1 | 1/2010 |
| WO | 2015066337 A1 | 5/2015 |
| WO | 2018213570 A2 | 11/2018 |

OTHER PUBLICATIONS

Esquivel-Upshaw, Josephine F., et al. "Resistance to staining, flexural strength, and chemical solubility of core porcelains for all-ceramic crowns" International Journal of Prosthodontics 14.3 (2001).

Esquivel-Upshaw, Josephine, et al. "Randomized, controlled clinical trial of bilayer ceramic and metal-ceramic crown performance." Journal of Prosthodontics: Implant, Esthetic and Reconstructive Dentistry 22.3 (2013): 166-173.

Fang, Y.; et al. Chromogenic Photonic Crystals Enabled by Novel Vapor-Responsive Shape Memory Polymers. Adv. Mater. 2015, 27, 3696-3704.

Fang, Y.; et al. Reconfigurable Photonic Crystals Enabled by Multistimuli-Responsive Shape Memory Polymers Possessing Room Temperature Shape Processability ACS Appl Mater Interfaces 2017, 9, 5457-5467.

Felton et al., Soft Matter "Self-folding with shape memory composites", Soft Matter, 2013, 9, 7688-7694.

Fenzl et al., "Photonic Crystals for Chemical Sensing and Biosensing", Angewandte Chemie Ed. 2015, 53: 3318-3335.

Fischer, H.; et al. "Effect of surface roughness on flexural strength of veneer ceramics." Journal of Dental Research 32.12 (2003): 972-975.

Flannery, Anthony F., et al. "PECVD silicon carbide as a chemically resistant material for micromachined transducers." Sensors and Actuators A: Physical 70.1-2 (1998): 48-55.

Fu, Q. Q.; et al. Hierarchically Structured Photonic Crystals for Integrated Chemical Separation and Colorimetric Detection Nanoscale 2017, 9, 2457-2463.

Fudouzi et al., "Colloidal Crystals with Tunable Colors and Their Use as Photonic Papers", Langmuir 2003, 19: 9653-9660.

G. Zhou, J. He, J. "Antireflective coatings on Fresnel lenses by spin-coating of solid silica nanoparticles", Nanosci. Nanotechnol. 13 (2013) Abstract.

G.M. Nogueira, D. Banerjee, R.E. Cohen, M.F. Rubner, "Spray-Layer-by-Layer Assembly Can More Rapidly Produce Optical-Quality Multistack Heterostructures", Langmuir 27 (2011) 7860-7867.

Ge et al., "Highly Tunable Superparamagnetic Colloidal Photonic Crystals", Angew. Chem. Int. Ed. 2007, 46 7428-7431.

Ge et al., "Rewritable Photonic Paper with Hygroscopic Salt Solution as Ink", Advanced Materials 2009, 21:4259-1264.

Ge, J. P.; et al. Responsive Photonic Crystals. Angew. Chem. Int. Ed. 2011, 50, 1492-1522.

Gemici et al., "Targeted Functionalization of Nanoparticle Thin Films via Capillary Condensation", Nano Letters 2009, 9, 3: 1064-1070.

Gourevich, I.; et al. Nanostructured Material for Optical Data Storage and Security Labeling. Chem. Mater. 2004, 16, 1471-1479.

Gourevich, Ilya, et al. "Multidye nanostructured material for optical data storage and security labeling." Chemistry of materials 16.8 (2004): 1472-1479.

Zhao, Q.; et al. Shape Memory Polymer Network with Thermally Distinct Elasticity and Plasticity. Sci. Adv. 2016, 2, e1501297.

Grigoras et al., Fabrication of porous membrane filter from p-type silicon, Physica Status Solidi (a) 202(8): 1624-1628.

Gu et al., "Water-triggered shape memory of multiblock thermoplastic polyurethanes (TPUs)", RSC Adv. 2013, 3: 15783-15791.

(56) References Cited

OTHER PUBLICATIONS

Gugliuzza et al., "A review on membrane engineering for innovation in wearable fabrics and protective textiles", Journal of Membrane Science 446(2013): 350-375.
H. Fudouzi, M. Kobayashi, N. Shinya, "Assembly of Microsized Colloidal Particles on Electrostatic Regions Patterned through Ion Beam Irradiation", Langmuir 18 (2002) 7648-7652.
H. Jiang, K. Yu, Y.C. Wang, "Antireflective structures via spin casting of polymer latex", Opt. Lett. 32 (2007) 575-577.
H. Nagel, A. Metz, R. Hezel, "Porous SiO2 films prepared by remote plasma-enhanced chemical vapour deposition—a novel antireflection coating technology for photovoltaic modulesng", Sol. Energ. Mater. Sol. C. 65 (2001) 71-77.
H. Shimomura, Z. Gemici, R.E. Cohen, M.F. Rubner, "Layer-by-Layer-Assembled High-Performance Broadband Antireflection Coatings", ACS Appl. Mater. Interface 2 (2010) 813-820.
Zhao, Q.; et al. Recent Progress in Shape Memory Polymer: New Behavior, Enabling Materials, and Mechanistic Understanding. Prog. Polym. Sci 2015, 49-50, 79-120.
H.Y. Koo, D.K. Yi, S.J. Yoo, D.Y. Kim, "A Snowman-like Array of Colloidal Dimers for Antireflecting Surfaces**", Adv. Mater. 16 (2004) 274-277.
Habault et al., "Light-triggered self-healing and shape-memory polymers", Chem. Soc. Rev. 2013, 42: 7244-7256.
Han et al., "Full Color Tunable Photonic Crystal from Crystalline Colloidal Arrays with an Engineered Photonic Stop-Band", Adv. Mater. 2012, 24,: 6438-6444.
Han, H; et al. "Metal-assisted chemical etching of silicon and nanotechnology applications" ScienceDirect 2014, 9, 271-304.
Zhang, Haixia, et al. "Application of PECVD SiC in glass micromachining." Journal of Micromechanics and Microengineering 17.4 (2007): 775.
Zhang, G. G.; et al. Unusual Aspects of Supramolecular Networks: Plasticity to Elasticity, Ultrasoft Shape Memory, and Dynamic Mechanical Properties. Adv Funct. Mater. 2016, 26, 931-937.
Hatton et al., "Assembly of large-area, highly ordered, crack-free inverse opal films", PNAS 2010, vol. 107, 23: 10354-10359.
Heintze, Siegward D; et al. "Survival of zirconia-and metal-supported fixed dental prostheses: a systematic review." International Journal of Prosthodontics 23.6 (2010).
Heo, Y.; et al. Controlled Insertion of Planar Defect in Inverse Opals for Anticounterfeiting Applications. ACS Appl. Mater. Interfaces 2017, 9, 43098-43104.
Heo, Y.; et al. Lithographically Encrypted Inverse Opals for Anti-Counterfeiting Applications. Small 2016,12, 3819-3826.
Herrmann, M. "Corrosion of silicon nitride materials in aqueous solutions." Journal of the American Ceramic Society 96.10 (2013): 3009-3022.
Herrmann, M., et al. "Corrosion of silicon nitride materials in acidic and basic solutions and under hydrothermal conditions." Journal of the European Ceramic Society 23.4 (2003): 585-594.
Heuwers et al., "Shape-Memory Natural Rubber: An Exceptional Material for Strain and Energy Storage", Macromolecular Chemistry and Physics 2013, 214: 912-923.
Heuwers et al., "Stress-Induced Stabilization of Crystals in Shape Memory Natural Rubber", Macromolecular Rapid Communications 2013, 34:180-184.
Holtz et al., "Polymerized colloidal crystal hydrogel films as intelligent chemical sensing materials", Nature 1997, 389: 829-832.
Hou, J.; et al. Four-Dimensional Screening Anti-Counterfeiting Pattern by Inkjet Printed Photonic Crystals. Chem.—An Asian J. 2016, 11, 2680-2685.
Hu, H. B.; et al. Magnetically Responsive Photonic Watermarks on Banknotes. J. Mater. Chem. C 2014, 2, 3695-3702.
Hu, H.; et al. Photonic Anti-Counterfeiting Using Structural Colors Derived from Magnetic-Responsive Photonic Crystals with Double Photonic Bandgap Heterostructures J. Mater. Chem. 2012, 22, 11048-11053.
Huang et al., "Water-driven programmable polyurethane shape memory polymer: Demonstration and mechanism", Applied Physics Letters 2005, 86: 1-3.
Huang, Z; et al. "Metal-Assisted chemical etching of silicon: a review" Advanced Materials 2011, 23, 285-308.
Li, Y., et al. "Broadband near-infrared antireflection coatings fabricated by three-dimensional direct laser writing." Optics letters 43.2 (2018): 239-242.
Lishchuk, P; et al. "Photoacoustic characterization of nanowire arrays formed by metal-assisted chemical etching of crystalline silicon subsliales with different doping level" ScienceDirect 2019, 131-136.
Liu et al., "Review of progress in shape-memory polymers", J. Mater. Chem., 2007, 17: 1543-1558.
Louette, P.; et al. Poly(Dimethyl Siloxane) (Pdms) Xps Reference Core Level and Energy Loss Spectra Surf. Sci. Spectra 2006, 12, 38-43.
Lv et al., "Shape-Memory Polymer in Response to Solution", Advanced Engineering Materials 2008, 10, No. 6: 592-595.
Lv, T.;; et al. Superhydrophobic Surface with Shape Memory Micro/Nanostructure and Its Application in Rewritable Chip for Droplet Storage ACS Nano 2016, 10, 9379-9386.
M. Ibn-Elhaj, M. Schadt, "Optical polymer thin films with isotropic and anisotropic nano-corrugated surface topologies", Nature 410 (2001) 796-799.
M. Kursawe, R. Anselmann, V. Hilarius, G. Pfaff, "Nano-Particles by Wet Chemical Processing in Commercial Applicaitons", J. Sol-Gel Sci. Technol. 33 (2005) 71-74.
M. Sakhuja, J. Son, L.K. Verma, H. Yang, C.S. Bhatia, A.J. Danner, "Omnidirectional study of nanostructured glass packaging for solar modules", Prog. Photovol. 22 (2014) 356-361.
M.F. Schubert, F.W. Mont, S. Chhajed, D.J. Poxson, J.K. Kim, E.F. Schubert, "Design of multilayer antireflection coatings made from co-sputtered and low-refractive-index materials by genetic algorithm", Opt. Exp. 16 (2008) 5290-5298.
M.G. Moharam, D.A. Pommet, E.B. Grann, T.K. Gaylord, "Stable implementation of the rigorous coupled-wave analysis for surface-relief gratings: enhanced transmittance matrix approuch", J. Opt. Soc. Am. A 12 (1995) 1077-1086.
M.I. Dafinone, G. Feng, T. Brugarolas, K.E. Tettey, D. Lee, "Mechanical Reinforcement of Nanoparticle Thin Films Using Atomic Layer Deposition", ACS Nano 5 (2011) 5078-5087.
M.S. Park, J.K. Kim, "Porous Structures of Polymer Films Prepared by Spin Coating with Mixed Solvents under Humid Condition", Langmuir 22 (2006) 4594-4598.
Maitland et al., "Photothermal Properties of Shape Memory Polymer Micro-Actuators for Treating Stroke", Lasers in Surgery and Medicine (2002) 30:1-11.
Mao, D.; et al. Design of Nano-Opto-Mechanical Reconfigurable Photonic Integrated Circuit. J. Lightwave Technol. 2013, 31, 1660-1669.
Mason et al., "Correlation between bulk morphology and luminescence in porous silicon investigated by pore collapse resulting from drying", Thin Solid Films 2002, 406: 151-158.
Mata, A.; et al. Characterization of Polydimethylsiloxane (Pdms) Properties for Biomedical Micro/Nanosystems. Biomed. Microdevices 2005, 7, 281-293.
Mather et al., "Shape Memory Polymer Research", Annu. Rev. Mater. Res. 2009. 39: 445-471.
Yue et al., "Lamellar Hydrogels with High Toughness and Ternary Tunable Photonic Stop-Band", Advanced Materials 2013, 25: 3106-3110.
McDonald, J. C.; et al. Poly(Dimethylsiloxane) as a Material for Fabricating Microfluidic Devices. Acc. Chem. Res. 2002, 35, 491-499.
Meng et al., "A Brief Review of Stimulus-active Polymers Responsive to Thermal, Light, Magnetic, Electric, and Water/Solvent Stimuli", Journal of Intelligent Material Systems and Structures, vol. 21—Jun. 2010: 859-885.
Meng et al., "Various shape memory effects of stimuli-responsive shape memory polymers", Smart Materials and Structures 2013, 22: 1-23.

(56) References Cited

OTHER PUBLICATIONS

Meng, Y.; et al. Patterned and Iridescent Plastics with 3d Inverse Opal Structure for Anticounterfeiting of the Banknotes. Adv. Opt. Mater. 2018, 6, 1701351.
Meng, Z. P.; et al. Structurally Colored Polymer Films with Narrow Stop Band, High Angle-Dependence and Good Mechanical Robustness for Trademark Anti-Counterfeiting. Nanoscale 2018, 10, 14755-14762.
Metwalli, E., et al. "Surface characterizations of mono-, di-, and tri-aminosilane treated glass substrates." Journal of colloid and interface science 298.2 (2006): 825-831.
Metzger et al., "Mechanical Properties of Mechanical Actuator for Treating Ischemic Stroke", Biomedical Microdevices 2002, 4:2: 89-96.
Milleding, Percy, et al. "Surface energy of non-corroded and corroded dental ceramic materials before and after contact with salivary proteins." European journal of oral sciences 107.5 (1999): 384-392.
Mittleman, D. M.; et al. Optical Properties of Planar Colloidal Crystals: Dynamical Diffraction and the Scalar Wave Approximation. J. Chem. Phys. 1999, 111, 345-354.
Miyazaki, Takashi, et al. "Current status of zirconia restoration." Journal of prosthodontic research 57.4 (2013): 236-261.
Mohr, Gerhard J., Daniel Citterio, and Ursula E. Spichiger-Keller. "Development of chromogenic reactands for optical sensing of alcohols." Sensors and Actuators B: Chemical 49.3 (1998): 226-234.
Moirangthem, M.; et al. An Optical Sensor Based on a Photonic Polymer Film to Detect Calcium in Serum. Adv. Funct. Mater. 2016, 26, 1154-1160.
Moirangthem, M.; et al. Photonic Shape Memory Polymer with Stable Multiple Colors. ACS Appl. Mater. Interface 2017, 9, 32161-32167.
Munakata, et al., Three-dimensionally ordered macroporous polyimide composite membrane with controlled pore size for direct methanol fuel cells, Journal of Power Sources 2008, 178(2): 596-602.
Nam, H.; et al. Inkjet Printing Based Mono-Layered Photonic Crystal Patterning for Anti-Counterfeiting Structural Colors. Sci. Rep. 2016, 6, 30885.
Nguyen et al., "Modeling the Relaxation Mechanisms of Amorphous Shape Memory Polymers", M. L. Chambers, Adv. Mater. 2010, 22: 3411-3423.
Ogawa, Yudai, et al. "Organic transdermal iontophoresis patch with built-in biofuel cell." Advanced healthcare materials 4.4 (2015): 506-510.
Pan et al., "Response of inverse-opal hydrogels to alcohols", Journal of Materials Chemistry 2012, 22: 2018-2025.
Park, H. G.; et al. Electrically Driven Single-Cell Photonic Crystal Laser. Science 2004, 305, 1444-1447.
Park, Wounjhang; et al. "Mechanically tunable photonic crystal structure." Applied Physics Letters 85.21 (2004): 4845-4847.
Peng, C. Y.; et al. Flexible Photonic Crystal Material for Multiple Anticounterfeiting Applications. ACS Appl. Mater. Interfaces 2018, 10, 9858-9864.
Pfeiffer, Kristin, et al. "Antireflection coatings for strongly curved glass lenses by atomic layer deposition." Coatings 7.8 (2017): 118.
Pham, H. H.; et al. Multidye Nanostructured Material for Optical Data Storage and Security Data Encryption. Adv. Mater. 2004, 16, 516-520.
Phillips; et al "Biomimetic broadband antireflection gratings on solar-grade multicrystalline silicon wafers" Applied Physics Letters; Nov. 9, 2011, vol. 99, pp. 191103 (1)-(3).
Pinto, Marcelo M., et al. "Influence of pH on slow crack growth of dental porcelains." dental materials 24.6 (2008): 814-823.
Potyrailo et al., "Morpho butterfly wing scales demonstrate highly selective vapour response", Nature photonics 2007, 1: 123-128.
Preis, Verena, et al. "Wear performance of dental ceramics after grinding and polishing treatments." Journal of the mechanical behavior of biomedical materials 10 (2012): 13-22.

Quitmann et al., "Environmental Memory of Polymer Networks under Stress", Adv. Mater. 2014, 26: 3441-3444.
Raigrodski, Ariel J.; et al. "The safety and efficacy of anterior ceramic fixed partial dentures: a review of the literature." The journal of prosthetic dentistry 86.5 (2001): 520-525.
Rosenstiel, S. F., et al. "Strength of a dental glass-ceramic after surface coating." Dental Materials 9.4 (1993): 274-279.
S. Degand, G. Lamblin, C.C. Dupont-Gillain, "Colloidal lithography using silica particles: Improved particle distribution and tunable wetting properties", J. Colloid Interf. Sci. 392 (2013) 219-225.
Cai, Z. Y.; et al. A Photonic Crystal Protein Hydrogel Sensor for Candida Albicans. Angew. Chem. Int. Ed. 2015, 54, 13036-13040.
Velev, O. D.; et al. Materials Fabricated by Micro- and Nanoparticle Assembly—the Challenging Path from Science to Engineering. Adv. Mater. 2009, 21, 1897-1905.
"Light" Wikipedia https://en.wikipedia.orgiwiindex.php?title=Light &oldid=797818857 (accessed Feb. 22, 2019).
"Using polyimide tape to mask against reactive-ion etching" Tech Briefs, 2002 (accessed Feb. 22, 2019).
A. Deak, B. Bancsi, A.L. Toth, A.L. Kovacs, Z. Horvolgyi, "Complex Langmuir-Blodgett films from silica nanoparticles: An optical spectroscopy study", Colloid Surf. A 278 (2006) 10-16.
A. Deak, I. Szekely, E. Kalman, Z. Keresztes, A.L. Kovacs, Z. Horvolgyi, "Nanostructured silica Langmuir-Blodgett films with antireflective properties prepared on glass substrates", Thin Solid Films 484 (2005) 310-317.
A. Gombert, B. Blasi, C. Buhler, P. Nitz, J. Mick, W. Hossfeld, M. Niggemann, "Some application cases and related manufacturing techniques for optically functional microstructures on large areas", Opt. Eng. 43 (2004) 2525-2533.
A. Gombert, W. Glaubitt, K. Rose, J. Dreibholz, B. Blasi, A. Heinzel, D. Sporn, W. Doll, V. Wittwer, "Subwavelength-structured antireflective surfaces on glass", Thin Solid Films 351 (1999) 73-78.
Zhong, K.; et al. Instantaneous, Simple, and Reversible Revealing of Invisible Patterns Encrypted in Robust Hollow Sphere Colloidal Photonic Crystals. Adv. Mater. 2018, 30, 1707246.
Zhao, Y.; et al. Bio-Inspired Variable Structural Color Materials. Chem. Soc. Rev. 2012, 41, 3297-3317.
Aguirre, C. I.; et al. Tunable Colors in Opals and Inverse Opal Photonic Crystals. Adv. Funct. Mater. 2010, 20, 2565-2578.
Aksoy, Gokhan, et al. "Effect of various treatment and glazing (coating) techniques on the roughness and wettability of ceramic dental restorative surfaces." Colloids and surfaces B: Biointerfaces 53.2 (2006): 254-259.
Al-Marzok, Maan; et al. "The effect of the surface roughness of porcelain on the adhesion of oral Streptococcus nutans." J Contemp Dent Pract 10.6 (2009): E017-24.
Arsenault et al., "From colour fingerprinting to the control of photoluminescence in elastic photonic crystals", nature materials 2006, 5: 179-184.
Asher et al., "Photonic Crystal Carbohydrate Sensors: Low Ionic Strength Sugar Sensing", J. Am. Chem. Soc. 2003, 125: 3322-3329.
B.-T. Liu, Y.-T. Teng, R.-H. Lee, W.-C. Liaw, C.-H. Hsieh, "Strength of the interactions between light-scattering particles and resins affects the haze of anti-glare films", Colloid Surf. A 389 (2011) 138-143.
B.E. Yoldas, D.P. Partlow, "Formation of Broad Band Antireflective Coatings on Fused Silica for High Power Laser Applications", Thin Solid Films 129 (1985) 1-14.
B.G. Prevo, E.W. Hon, O.D. Velev, "Assembly and characterization of colloid-based antireflective coatings on multicrystalline silicon solar cells", J. Mater. Chem. 17 (2007) 791-799.
B.G. Prevo, O.D. Velev, "Controlled, Rapid Deposition of Structured Coatings from Micro-and Nanoparticle Suspensions", Langmuir 20 (2004) 2099-2107.
B.T. Liu, W.D. Yeh, "Antireflective surface fabricated from colloidal silica nanoparticles", Colloid Surf. A 356 (2010) 145-149.
B.T. Liu, W.D. Yeh, "Reflective properties of nanoparticle-arrayed surfaces", Thin Solid Films 518 (2010) 6015-6021.
B.T. Liu; et al. "A novel method to control inner and outer haze of an anti-glare film by surface modification of light-scattering particles", J Colloid Interf. Sci. 350 (2010) 421-426.

(56) References Cited

OTHER PUBLICATIONS

Bartlett, D. W., et al. "The association of tooth wear, diet and dietary habits in adults aged 18-30 years old." Journal of dentistry 39.12 (2011): 811-816.
Behl et al., "Multifunctional Shape-Memory Polymers", Adv. Mater. 2010, 22: 3388-3410.
Bertone et al., "Thickness Dependence of the Optical Properties of Ordered Silica-Air and Air-Polymer Photonic Crystals", Physical Review Letters 1999, 83, 2: 300-303.
Boyle, B. M.; et al. Structural Color for Additive Manufacturing: 3d-Printed Photonic Crystals from Block Copolymers. ACS Nano 2017, 11, 3052-3058.
Burgess et al., "Structural colour in colourimetric sensors and indicators", Journal of Materials Chemistry C 2013, 1: 6075-6086.
Burgess, I. B.; et al. Encoding Complex Wettability Patterns in Chemically Functionalized 3d Photonic Crystals. J. Am. Chem. Soc. 2011, 133, 12430-12432.
Butler, Craig J., et al. "Effect of fluoride and 10% carbamide peroxide on the surface roughness of low-fusing and ultra low-fusing porcelain." The Journal of prosthetic dentistry 92.2 (2004): 179-183.
C. Heine, R.H. Morf, "Submicrometer gratings for solar energy applications", Appl. Opt. 34 (1995) 2476-2482.
C. Yakacki, "Shape-Memory and Shape-Changing Polymers", Polymer Reviews, 2013, 53: 1-5.
C.M. Kennemore Iii, U.J. Gibson, "Ion beam processing for coating MgF2 onto ambient temperature substrates", Appl. Opt. 23 (1984) 3608-3611.
C.S. Thompson, R.A. Fleming, M. Zou, "Solar Energy Materials & Solar Cells", Sol Energ Mater Sol C 115 (2013) 108-113.
Cansizoglu, H; et al. "Optical absorption properties of semiconducting nanostructures with different shapes" Advanced Optical Materials 2013, 1, 156-166. (Year: 2013).
Cao, Z; et al. "Study on the impact of silicon doping level on the trench profile using metal-assisted chemical etching" 2016, vol. 12,742-746.
Ccahuana, Vanessa ZS, et al. "Surface degradation of glass ceramics after exposure to acidulated phosphate fluoride." Journal of Applied Oral Science 18.2 (2010): 155-165.
Chan et al., "Mechanochromic Photonic Gels", Advanced Materials 2013, 25: 3934-3947.
Chen; et al. "Directed water shedding on high-aspect-ratio shape memory polymer micropillar arrays" Advanced Materials, 2014, pp. 1283-1288, vol. 26, doi: 10.1002/adma.201304030.
Cho, Y.; et al. Elastoplastic Inverse Opals as Power-Free Mechanochromic Sensors for Force Recording. Adv. Funct. Mater. 2015, 25, 6041-6049.
Creugers, Nico HJ; et al. "A meta-analysis of durability data on conventional fixed bridges." Community Dentistry and Oral Epidemiology 22.6 (1994): 448-452.
Cui et al., "Inverse Opal Spheres Based on Polyionic Liquids as Functional Microspheres with Tunable Optical Properties and Molecular Recognition Capabilities", Angew. Chem. Int. Ed. 2014, 53: 3844-3848.
D. Chen, "Anti-reflection (AR) coatings made by sol-gel processes: A review", Sol. Energ. Mater. Sol. C. 68 (2001) 313-336.
D. Lee, M.F. Rubner, R.E. Cohen, "All-Nanoparticle Thin-Film Coatings", Nano Lett. 6 (2006) 2305-2312.
D. Lee, Z. Gemici, M.F. Rubner, R.E. Cohen, "Multilayers of Oppositely Charged SiO2 Nanoparticles: Effect of Surface Charge on Multi9layer Assembly", Langmuir 23 (2007) 8833-8837.
D.G. Stavenga; et al. "Light on the moth-eye corneal nipple array of butterflies", Proc. R. Soc. B 273 (2006) 661-667.
Dangla, R.; et al. Microchannel Deformations Due to Solvent-Induced Pdms Swelling. Lab Chip 2010, 10, 2972-2978.
Ding et al., "Morphology and Water Vapor Permeability of Temperature-Sensitive Polyurethanes", Journal of Applied Polymer Science, (2008) vol. 107: 4061-4069.
Ding, T.; et al. Revealing Invisible Photonic Inscriptions: Images from Strain. ACS Appl. Mater. Interfaces 2015, 7, 13497-13502.
Drummond, J. L., D; et al. "Physiological aging of an all-ceramic restorative material." Dental Materials 7.2 (1991) 133-137.
Du et al., "Solvent induced shape recovery of shape memory polymer based on chemically cross-linked poly(vinyl alcohol)", Soft Matter, 2010, 6: 3370-3376.
S. Lu,; et al. "Receptor-Ligand-Based Specific Cell Adhesion on Solid Surfaces: Hippocampal Neuronal Cells on Bilinker Functionalized Glass" Nano Lett. 6 (2006) 1977-1981.
S. Walheim, E. Schäffer, J. Mlynek, U. Steiner, "Nanophase-Separated Polymer Films as High-Performance Antireflection Coatings", Science 283 (1999) 520-522.
S.P. Pack, et al. "Direct immobilization of DNA oligomers onto the amine-functionalized glass surface for DNA microarray fabrication through the activation-free reaction of oxanine", Nucleic Acids Res. 35 (2007), 10 pages.
Sailer, Irena, et al. "A systematic review of the survival and complication rates of all-ceramic and metal-ceramic reconstructions after an observation period of at least 3 years. Part II: fixed dental prostheses." Clinical oral implants research 18 (2007): 86-96.
Salido, María P., et al. "Prospective clinical study of zirconia-based posterior four-unit fixed dental prostheses: four-year follow-up" International Journal of Prosthodontics 25.4 (2012).
Schäfer et al., "Fully Reversible Shape Transition of Soft Spheres in Elastomeric Polymer Opal Films", Langmuir 2013, 29: 11275-11283.
Schäfer et al., "Reversible Light-, Thermo-, and Mechano-Responsive Elastomeric Polymer Opal Films", Chemistry of Materials 2013, 25: 2309-2318.
Schauer, S.; et al. Tunable Diffractive Optical Elements Based on Shape-Memory Polymers Fabricated via Hot Embossing. ACS Appl. Mater. Interfaces 2016, 8, 9423-9430.
Schneider, Friedrich. "The financial flows of transnational crime and tax fraud in OECD countries: What do we (not) know?." Public Finance Review 41.5 (2013): 677-707.
Scurria, Mark S.; et al. "Meta-analysis of fixed partial denture survival: prostheses and abutments." The Journal of prosthetic dentistry 79.4 (1998): 459-464.
Shang, S. L.; et al Fabrication of Magnetic Field Induced Structural Colored Films with Tunable Colors and Its Application on Security Materials. J. Colloid Interface Sci. 2017, 485, 18-24.
Small IV, et al., "Laser-activated shape memory polymer intravascular thrombectomy device", Optics Express 2005, 13: 8204-8213.
Stöber, W.; et al. Controlled Growth of Monodisperse Silica Spheres in Micron Size Range. J. Colloid Interface Sci. 1968, 26, 62-69.
Stojilovic, N., Why Can't We See Hydrogen in X-Ray Photoelectron Spectroscopy? J. Chem. Edu. 2012, 89, 1331-1332.
Stuart et al., "Emerging applications of stimuli-responsive polymer materials", Nature Materials 2010, 9: 101-113.
Sun; et al. "Broadband moth-eye antireflection coatings on silicon" Applied Physics Letters; Feb. 14, 2008, vol. 92, pp. 061112 (1)-(3).
T. Lohmueller, M. Helgert, M. Sundermann, R. Brunner, J.P. Spatz, "Biomimetic Interfaces for High-Performance Optics in the Deep-UV Light Range", Nano Lett. 8 (2008) 1429-1433.
T. Xie, "Recent advances in polymer shape memory", Polymer 2011, 52: 4985-5000.
Takeoka et al., "Polymer Gels that Memorize Structures of Mesoscopically Sized Templates. Dynamic and Optical Nature of Periodic Ordered Mesoporous Chemical Gels", Langmuir 2002, 18: 5977-5980.
Tobushi et al., "Thermomechanical properties in a thin film of shape memory polymer of polyurethane series", Smart Mater. Struct. (1996) 5: 483-491.
Toor, F; et al. "Nanostructured silicon via metal assisted catalyzed etch (MACE): chemistry fundamentals and pattern engineering" Nanotechnology 2016, 27, 412003.
Tsai et al., "Retainment of pore connectivity in membranes prepared with vapor-induced phase separation", Journal of Membrane Science 2010, 362: 360-373.
U. Schulz, "Review of modern techniques to generate antireflective propoerties on thermoplastic polymers", Appl. Opt. 45 (2006) 1608-1618.

(56) References Cited

OTHER PUBLICATIONS

Yoon, B.; et al., Recent Functional Material Based Approaches to Prevent and Detect Counterfeiting. J. Mater. Chem. C 2013, 1, 2388-2403.
Ye et al., "Invisible Photonic Prints Shown by Deformation", Advanced Functional Materials 2014, 24: 6430-6438.
Velev et al., "Porous silica via colloidal crystallization", Nature 1997, 389: 447-448.
Vlasov, Y. A.; et al. On-Chip Natural Assembly of Silicon Photonic Bandgap Crystals. Nature 2001, 414, 289-293.
W.L. Min, B. Jiang, P. Jiang, "Bioinspired Self-Cleaning Antireflection Coatings", Adv. Mater. 20 (2008) 3914-3918.
Wang, M. S.; et al. Magnetically Responsive Nanostructures with Tunable Optical Properties. J. Am. Chem. Soc. 2016, 138, 6315-6323.
Wang, Zhen, et al. "Programmable, pattern-memorizing polymer surface." Advanced Materials 23.32 (2011): 3669-3673.
Weissman et al., "Thermally Switchable Periodicities and Diffraction from Mesoscopically Ordered Materials", Science 1996, 274: 959-960.
Witt, Kendhl Kate. "Optical Sensors for the Analysis of Alcohols in Fuels." (2016).
Woo et al., Preparation and characterization of three dimensionally ordered macroporous Li4Ti5O12 anode for lithium batteries. Electrochimica Acta 2007, 53(1): 79-82.
Yang, D. P.; et al. Polymerization-Induced Colloidal Assembly and Photonic Crystal Multilayer for Coding and Decoding. Adv. Funct. Mater. 2014, 24, 817-825.
Wu, S. L.; et al. Structural Color Patterns on Paper Fabricated by Inkjet Printer and Their Application in Anticounterfeiting. J. Phys. Chem. Lett. 2017, 8, 2835-2841.
X. Li, O. Niitsoo, A. Couzis, "Electrostatically driven adsorption of silica nanoparticles on functionalized surfaces", J. Colloid Interf. Sci. 394 (2013) 26-35.
X. Li, O. Niitsoo, A. Couzis, "Experimental studies on irreversibility of electrostatic adsorption of silica nanoparticles at solid-liquid interface", J. Colloid Interf. Sci. 420 (2014) 50-56.
X.T. Zhang, O. Sato, M. Taguchi, Y. Einaga, T. Murakami, A. Fujishima, "Self-Cleaning Particle Coating with Antireflection Properties", Chem. Mater. 17 (2005) 696-700.
Xie et al., "Encoding Localized Strain History Through Wrinkle Based Structural Colors", Advanced Materials 2010, 22: 4390-4394.
Xu et al., "Deformable, Programmable, and Shape-Memorizing Micro-Optics", Advanced Functional Materials 2013, 23: 3299-3306.
Xue et al., "Synthesis and characterization of elastic star shape-memory polymers as self-expandable drug-eluting stents", Journal of Materials Chemistry 2012, 22: 7403-7411.
Y. Masuda, M. Itoh, T. Yonezawa, K. Koumoto, "Low-Dimensional Arrangement of SiO2 Particles", Langmuir 18 (200) 4155-4159.
Y. Zhao, J.S. Wang, G.Z. Mao, "Colloidal subwavelength nanostructures for anti reflection optical coatings", Opt. Lett. 30 (2005) 1885-1887.
Yakacki et al., "Shape-Memory Polymers for Biomedical Applications", Adv. Polym. Sci. 2010, 226: 147-175.
Yakacki et al., "Unconstrained recovery characterization of shape-memory polymer networks for cardiovascular applications", ScienceDirect, Biomaterials 2007, 28:2255-2263.
Yakacki, Christopher M., et al. "Impact of shape-memory programming on mechanically-driven recovery in polymers." Polymer 52.21 (2011): 4947-4954.
Yang et al., "From Metastable Colloidal Crystalline Arrays to Fast Responsive Mechanochromic Photonic Gels: An Organic Gel for Deformation-Based Display Panels", Adv. Funct. Mater. 2014, 24: 3197-3205.
Yang et al., "Macroporous photonic crystal-based vapor detectors created by doctor blade coating", Appl. Phys. Lett. 2011, 98: 1-3.
International Search Report and Written Opinion issued in PCT/US2017/046886 dated Oct. 20, 2017.

Fang, et al. Reconfigurable photonic crystals enabled by pressure-responsive shape-memory polymers. Nature Communications. Jun. 15, 2015. vol. 6: 7416.
A. Lendlein, "Shape-Memory Polymers", Advances in Polymer Science 226, Springer, New York, NY 2010, 1-209.
A. Luque, S. Hegedus, Handbook of Photovoltaic Science and Engineering. John Wiley & Sons, West Sussex, 2003, 115 pages.
Gregg, S. J.; et al. Adsorption, Surface Area and Porosity. 2nd ed.; Academic Press Inc.: London, 1982.
H.A. Macleod, Thin-Film Optical Filters. Third ed., Institute of Physics Publishing, Bristol, 2001, 666 pages.
J. D. Joannopoulos, R. D. Meade, J. N. Winn, Photonic Crystals: Molding the Flow of Light, Princeton University Press, 135 pages.
International Preliminary Report on Patentability dated May 10, 2013 for PCT Patent Application No. PCT/US2011/057484.
International Search Report and Written Opinion for PCT/US2014/063163 dated Jun. 25, 2015.
International Search Report and Written Opinion dated Jun. 26, 2012 for PCT Patent Application No. PCT/US2011/057484.
International Search Report for International Application No. PCT/US2018/033173, dated Nov. 21, 2018.
International Search Report for International Application No. PCT/US2019/017862, dated Jan. 21, 2020.
International Search Report for PCT/US19/38193 dated Sep. 5, 2019.
International Search Report for PCT/US2018/066234 dated Mar. 25, 2019.
International Search Report for PCT/US2018/066349 dated Mar. 15, 2019.
International Search Report for PCT/US2018/066353 dated Mar. 15, 2019.
Onov, Leonid. "Soft microorigami: self-folding polymer films." Soft Matter 7.15 (2011): 6786-6791.
J. Aizenberg, P.V. Braun, P. Wiltzius, "Patterned Colloidal Deposition Controlled by Electrostatic and Capillary Forces", Phys. Rev. Lett 84 (2000) 2997-3000.
Zhang et al., Fabrication and bioseparation studies of adsorptive membranes/felts made from electrospun cellulose acetate nanofibers, Journal of Membrane Science 2008, 319(1-2):176-184.
J. Tien, A. Terfort, G.M. Whitesides, "Microfabrication through Electrostatic Self-Assembly", Langmuir 13 (1997) 5349-5355.
J.-H. Kim, S. Fujita, S. Shiratori, "Design of a thin film for optical applications, consisting of high and low refractive index multilayers, fabricated by a layer-by-layer self-assembly method", Colloid Surf. Aspects 284-285 (2006) 290-294.
J.A. Hiller, J.D. Mendelsohn, M.F. Rubner, "Reversibly erasable nanoporous anti-reflection coatings from polyelectrolyte multilayers", Nat. Mater. 1 (2002) 59-63.
J.Q. Xi, M.F. Schubert, J.K. Kim, E.F. Schubert, M. Chen, S.-Y. Lin, LiuW, J.A. Smart, "Optical thin-film materials with low refractive index for broadband elimination of Fresnel reflection", Nat. Photon. 1 (2007) 176-179.
Jang et al., "Combining Pattern Instability and Shape-Memory Hysteresis for Phononic Switching", Nano Lett. 2009, 9, 5: 2113-2119.
Yunus, S.; et al. Diffusion of Oligomers from Polydimethylsiloxane Stamps in Microcontact Printing: Surface Analysis and Possible Application Surf. Interface Anal. 2007, 39, 922-925.
Jiang et al., "Template-Directed Preparation of Macroporous Polymers with Oriented and Crystalline Arrays of Voids", J. Am. Chem. Soc. 1999, 121: 11630-11637.
Jiang, P.; et al. Single-Crystal Colloidal Multilayers of Controlled Thickness. Chem. Mater. 1999, 11, 2132-2140.
Joannopoulos, J. D.; et al. Photonic Crystals: Molding the Flow of Light. Princeton University Press: Princeton, 1995.
K. Askar, B.M. Phillips, X. Dou, J. Lopez, C. Smith, B. Jiang, P. Jiang, "Self-assembled nanoparticle antiglare coatings", Opt. Lett. 37 (2012) 4380-4382.
K.M. Yeung, W.C. Luk, K.C. Tam, C.Y. Kwong, M.A. Tsai, H.C. Kuo, A.M.C. Ng, A.B. Djurisic, "2-Step self-assembly method to fabricate broadband omnidirectional antireflection coating in large scale", Sol Energ Mater Sol C 95 (2011) 699-703.

(56) References Cited

OTHER PUBLICATIONS

Kang et al., "Broad-wavelength-range chemically tunable block-copolymer photonic gels", Nature Materials 2007, 6: 957-960.

Karrock, Torben; et al. "Pressure sensor based on flexible photonic crystal membrane." Biomedical optics express 6.12 (2015): 4901-4911.

Keller, K.; et al. Inkjet Printing of Multicolor Daylight Visible Opal Holography. Adv. Funct. Mater. 2018, 28, 1706903.

Kloxin et al., "Covalent adaptable networks: smart, reconfigurable and responsive network systems", Chem. Soc. Rev. 2013, 42: 7161-7173.

Kluhr et al., Partially Oxidized Macroporous Silicon: A Three-Dimensional Photonic Matrix for Microarray Applications, Advanced Materials 2006, 18(23): 3135-3139.

Kobatake; et al. "Rapid and reversible shape changes of molecular crystals on photoirradiation" vol. 446, Apr. 12, 2007, doi: 10.1038/nature05669, pp. 1-4.

Koerner et al., "Remotely actuated polymer nanocomposites—stress-recovery of carbon-nanotube-filled thermoplastic elastomers", nature materials 2004, 3: 115-120.

Kukiattrakoon, Boonlert; et al. "Chemical durability and microhardness of dental ceramics immersed in acidic agents." Acta Odontologica Scandinavica 68.1 (2010): 1-10.

Kukiattrakoon, Boonlert; et al. "Degradability of fluorapatite-leucite ceramics in naturally acidic agents." Dental materials journal (2010): 1008310070-1008310070.

Kukiattrakoon, Boonlert; et al. "Effect of acidic agents on surface roughness of dental ceramics." Dental research journal 8.1 (2011): 6.

Kukiattrakoon, Boonlert; et al. "The effect of acidic agents on surface ion leaching and surface characteristics of dental porcelains." The journal of prosthetic dentistry 103.3 (2010): 148-162.

Kukiattrakoon, Boonlert; et al. "Vieker's microhardness and energy dispersive x-ray analysis of fluorapatite-leucite and fluorapatite ceramics cyclically immersed in acidic agents." Journal of oral science 51.3 (2009): 443-450.

Kunzelman et al., "Shape memory polymers with built-in threshold temperature sensors", Journal of Materials Chemistry 2008, 18: 1082-1086.

Kuswandi; et al., "A Simple Visual Ethanol Biosensor Based on Alcohol Oxidase Immobilized onto Polyaniline Film for Halal Verification of Fermented Beverage Samples", Feb. 2014, Sensors, 14(2):2135-2149 (Year: 2014).

Kuznetsov, A. I.; et al. Optically Resonant Dielectric Nanostructures. Science 2016, 354, 2472.

L. Ionov, "3D Microfabrication using Stimuli-Responsive Self-Folding Polymer Films", Polymer Reviews, 2013, 53: 92-107.

Lee, E.; et al. Bio-Inspired Responsive Polymer Pillar Arrays. MRS Commun. 2015, 5, 97-114.

Lee, H. S.; et al. Colloidal Photonic Crystals toward Structural Color Palettes for Security Materials. Chem. Mater. 2013, 25, 2684-2690.

Lee, J. N.; et al. Solvent Compatibility of Poly(Dimethylsiloxane)-Based Microfluidic Devices. Anal. Chem. 2003, 75, 6544-6554.

Lendlein et al., "Biodegradable, Elastic Shape-Memory Polymers for Potential Biomedical Applications", Science 2002, vol. 296: 1673-1676.

Yue et al., "Mechano-actuated ultrafast full-colour switching in layered photonic hydrogels", nature communications 2014: 1-8.

Lendlein, A.; et al. Shape-Memory Polymers. Angew. Chem. Int. Ed. 2002, 41, 2034-2057.

Leng et al., "Shape-Memory Polymers—A Class of Novel Smart Materials", MRS Bulletin 2009, 34: 848-855, www.mrs.org/bulletin.

Leng et al., "Synergic effect of carbon black and short carbon fiber on shape memory polymer actuation by electricity", Journal of Applied Physics 2008, 104: 1-4.

Leo, S. Y.; et al. Chromogenic Photonic Crystal Sensors Enabled by Multistimuli-Responsive Shape Memory Polymers Small 2018, 14, 1703515.

Li, H. L.; et al. Superoleophilic and Superhydrophobic Inverse Opals for Oil Sensors. Adv. Funct. Mater. 2008, 18, 3258-3264.

Li, P.; et al. Novel Programmable Shape Memory Polystyrene Film: A Thermally Induced Beam-Power Splitter. Sci. Rep. 2017, 7, 44333.

\* cited by examiner

FIG. 6
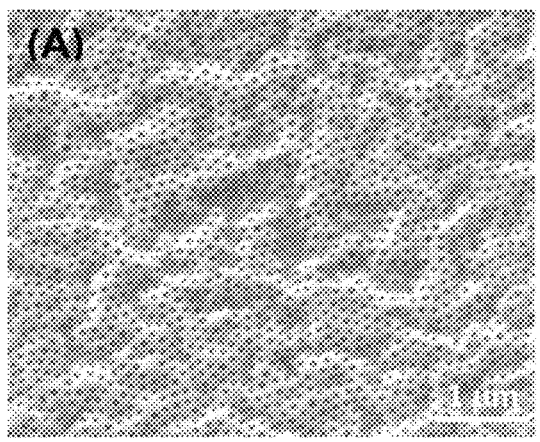
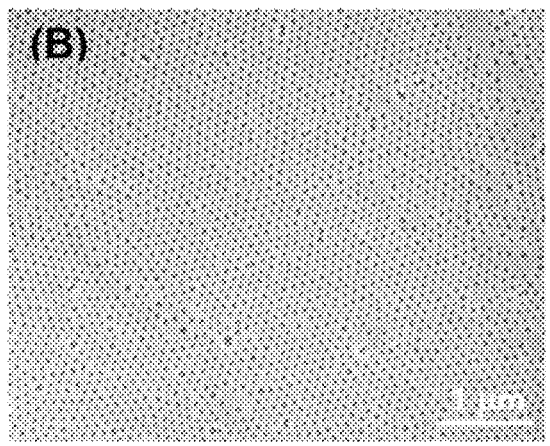
FIG. 7A          FIG. 7B

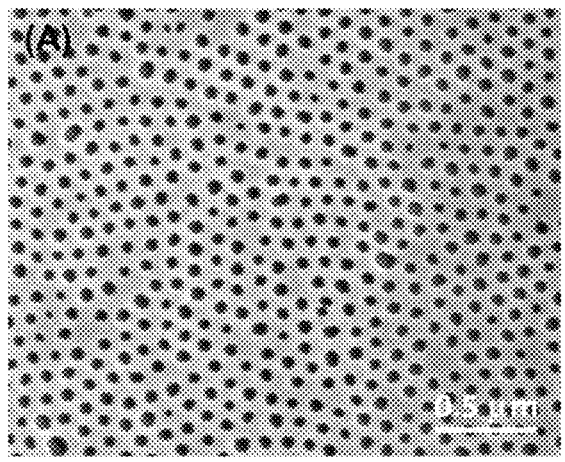
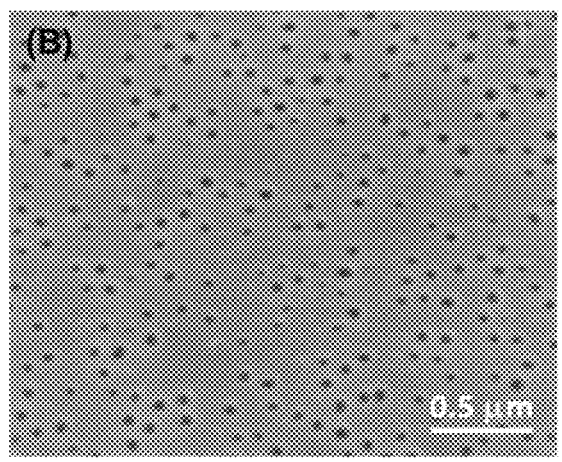
FIG. 10A  FIG. 10B
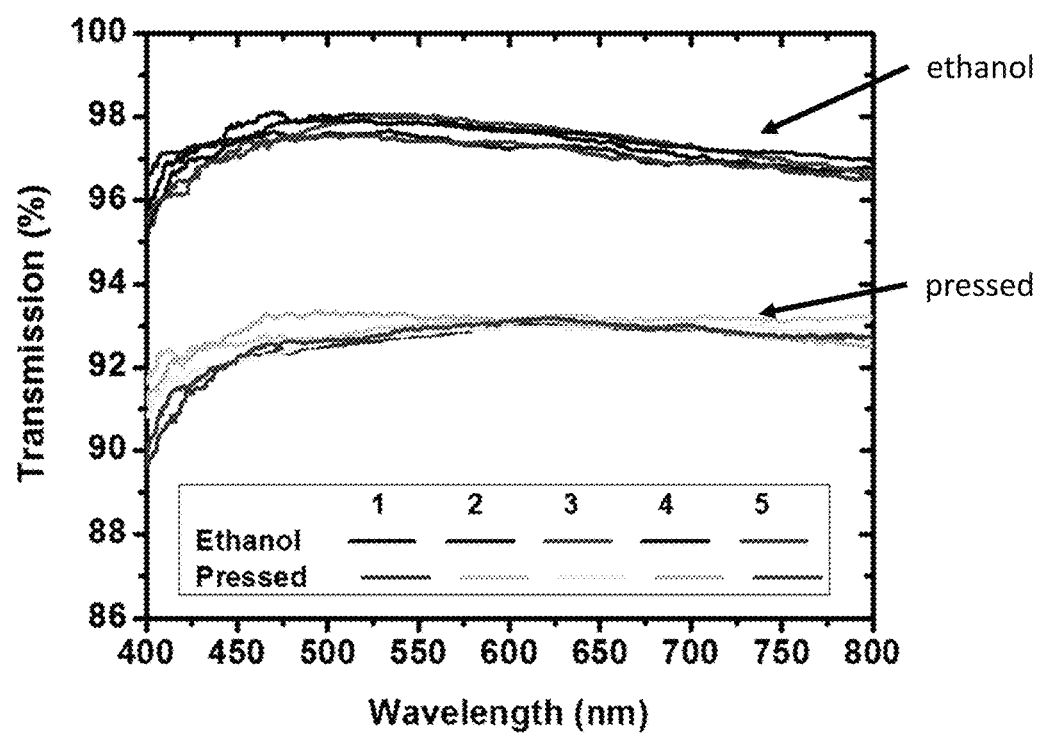
FIG. 11

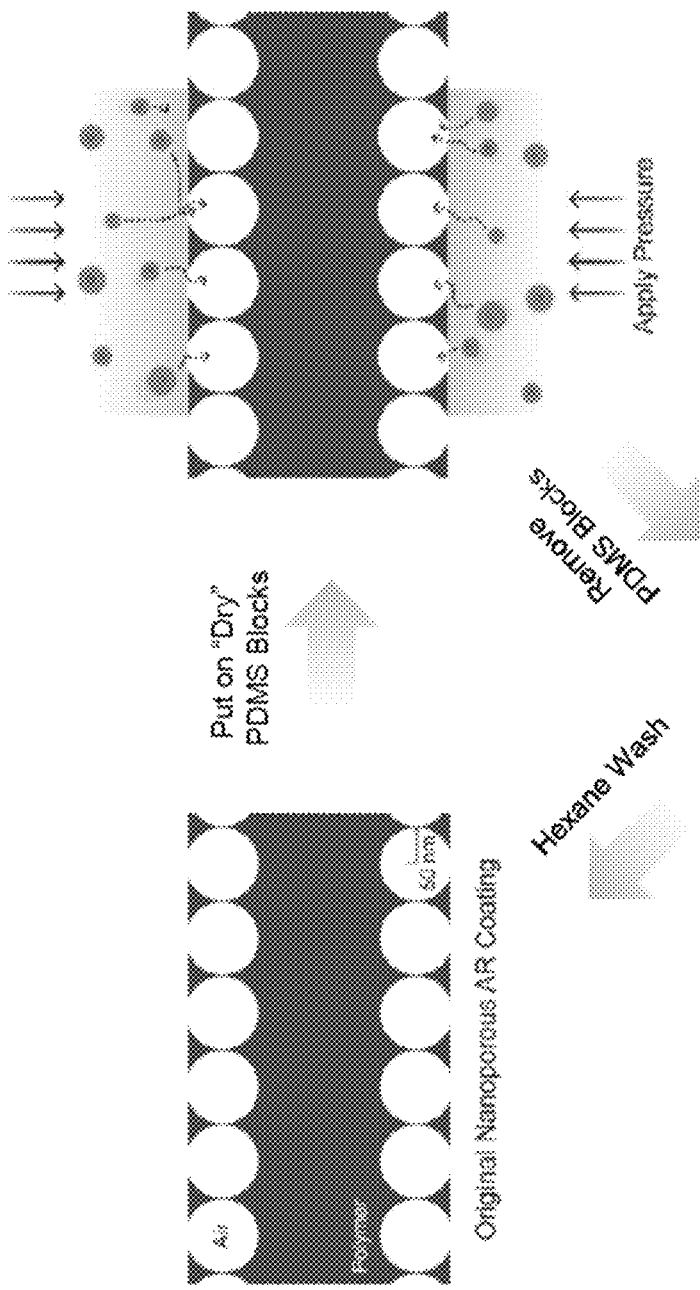

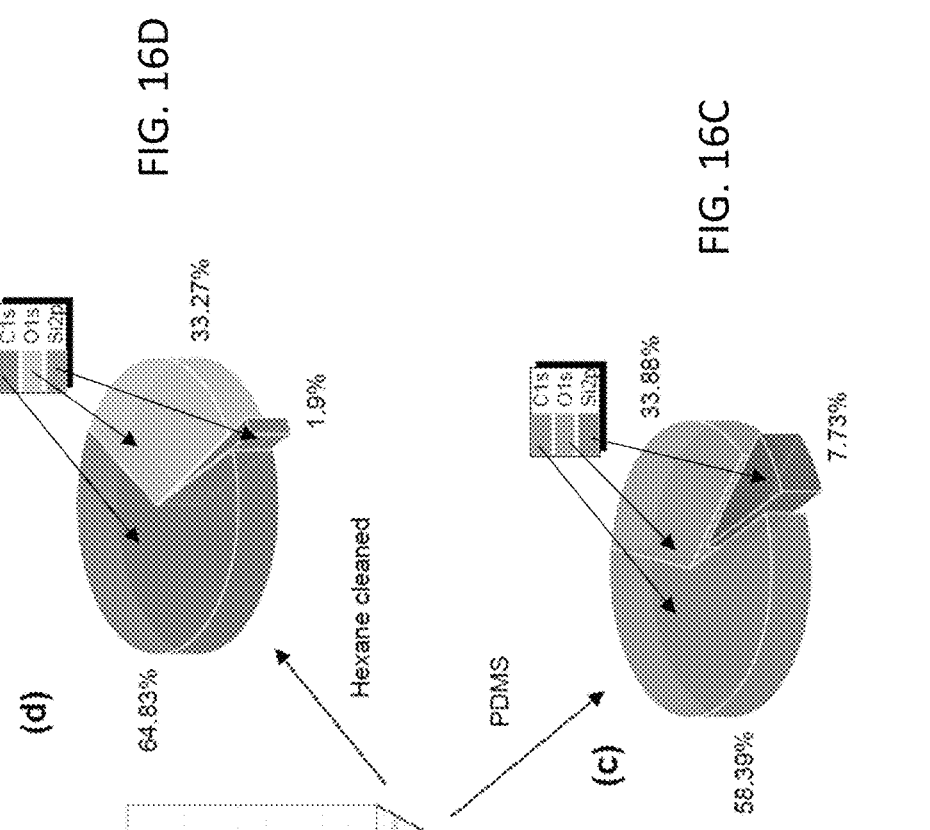
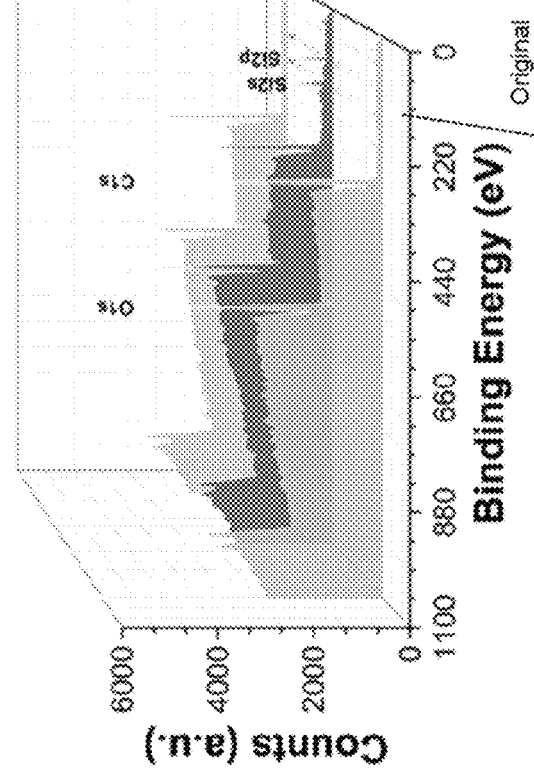
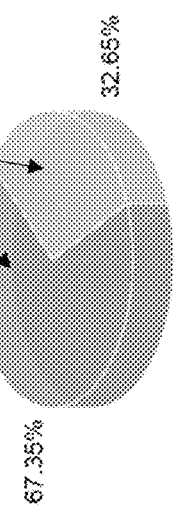
FIG. 16A
FIG. 16B
FIG. 16C
FIG. 16D

METHODS AND COMPOSITIONS RELATING TO TUNABLE NANOPOROUS COATINGS

CROSS-REFERENCE TO RELATED APPLICATION

This application is a continuation of co-pending U.S. patent application Ser. No. 16/277,579, filed on Feb. 15, 2019, entitled "METHODS AND COMPOSITIONS RELATING TO TUNABLE NANOPOROUS COATINGS," and which U.S. patent application Ser. No. 16/277,579 is a continuation-in-part of International Patent Application entitled "METHODS AND COMPOSITIONS RELATING TO TUNABLE NANOPOROUS COATINGS", having serial number PCT/US2017/046886, with an international filing date of Aug. 15, 2017, which claims priority to U.S. provisional application entitled "METHODS AND COMPOSITIONS RELATING TO TUNABLE NANOPOROUS COATINGS," having Ser. No. 62/375,172, filed on Aug. 15, 2016, which are entirely incorporated herein by reference.

FEDERAL SPONSORSHIP

This invention was made with Government support under Contract/Grant No. HDTRA1-15-1-0022, awarded by the US Defense Threat Reduction Agency, Contract/Grant No NNX14AB07G, awarded by the NASA and US Defense Threat Reduction Agency, and Contract/Grant No CMMI-1562861, awarded by the National Science Foundation. The Government has certain rights in this invention.

BACKGROUND

Anti-reflection (AR) coatings are widely used in a spectrum of optical and optoelectronic devices, such as: monitors, car dashboards, optical lenses, photodiodes, and solar cells, for example. Although widely used, traditional quarter-wavelength antireflection coatings can only support passive operations. With the recent development of many smart devices, there is an urgent need to develop smart optical coatings that can regulate the light transmission and reflection, actively and passively. Tunable antireflection coatings that can change the optical transmission and reflection in an active or passive manner are therefore important for developing next generation smart optical and optoelectronic devices.

Currently available technologies that enable tunable antireflection coatings of optical and optoelectronic devices are very limited. Current technologies are additionally hampered by limitations that prevent their widespread adoption and implementation. For example, one previous approach uses tedious layer-by-layer assembly of polyelectrolytes to achieve antireflection tunability by controlling the opening and closing of nanopores. Unfortunately, this approach only works in aqueous solutions by tuning the pH values of the solution, limiting the application of this technology. Accordingly, there is a need to address the aforementioned deficiencies and inadequacies.

SUMMARY

Methods and compositions relating to tunable nanoporous coatings are described herein. In certain aspects, methods as described herein can comprise forming at least one silica layer with silica nanoparticles; transferring the silica layer onto at least one first surface of one or more substrates; creating a volume between the first surface and at least one opposing second surface of a second substrate; adding a monomer composition into the volume between the opposing first and second surfaces; polymerizing the monomer composition with a polymerization method to form a tunable polymer membrane; and removing the at least one silica layer on the one or more substrates with the first solvent. Methods can further comprise washing the tunable polymer membrane with a second solvent after removing the silica layers. Methods as described herein can further comprise transferring at least one silica layer onto at least one second surface of the second substrate.

In systems and methods as described herein, the silica nanoparticles are $SiO_2$ nanoparticles with a diameter of about 100 nm to about 10,000 nm. A silica layer of compositions and methods described herein can comprise a monolayer of colloidal silica crystals. Compositions and methods as described herein can comprise one or more substrates comprising glass.

Monomer compositions of compositions and methods described herein can comprise polymerized polyethylene glycol diacrylate (PEGDA), polyethylene glycol (600) diacrylate (PEGDA 600), ethoxylated trimethylolpropane triacrylate (ETPTA), ethoxylated (20) trimethylolpropane triacrylate (ETPTA 20), or a combination thereof.

The first solvent of methods as described herein can be 2% hydrofluoric acid. Methods as described herein can further comprise applying the tunable polymer membrane to a surface. Methods as described herein can further comprise tuning the tunable polymer membrane by a first tuning method to create a tuned polymer membrane. Methods as described herein can further comprise tuning the tuned polymer membrane with a second tuning method. A first tuning method in methods as described herein can be the application of a force. Other tuning methods, or a second tuning method, of methods as described herein can comprise the application of a solvent and drying the membrane. Methods as described herein can further comprise initiating a tuning cycle. A tuning cycle of methods as described herein can alter the optical transmission of the tunable membrane from below 94% to above 98% or above 98% to below 94%.

The tuning cycle of methods as described herein can comprise a first tuning method to create a first tuning state of the tunable polymer membrane followed by a second tuning cycle to create a second tuning state. Tuning cycles of methods as described herein can be repeated more than one time.

Methods as described herein can comprise a first tuning method, which can be selected from the group consisting of applying a force or immersing in a solvent and drying.

A first tuning method of methods as described herein can be selected from the group consisting of applying a force or immersing in a solvent and drying the membrane.

In an embodiment, a method for fabricating a tunable polymer membrane comprises assembling a polymer casting apparatus. The polymer casting apparatus can comprise a container configured to hold a first solvent and at least one or more substrates with at least one silica coated first surface. The container can be configured so at least one silica coated first surface of the one or more substrates opposes at least a second surface. The second surface can be uncoated or coated with the silica layer. A volume can exist in between the silica coated first surface and the second surface. The container can be further configured so the solvent can fully immerse at least the silica layer of the opposing silica coated first surface and the second surface.

In certain aspects, methods as described herein can comprise adding a monomer composition into a volume between the opposing first and second surfaces; polymerizing the monomer composition with a polymerization method to form a tunable polymer membrane; and removing the at least one silica layer on the one or more substrates with the first solvent. In certain aspects, methods as described herein can further comprise forming a silica layer with silica nanoparticles; and transferring the silica layer onto at least one surface of one or more substrates.

Compositions as described herein can be products of any of the methods described herein and result from the processes as described herein.

Described herein are embodiments of methods of tuning a tunable polymer membrane. Embodiments as described herein can comprise providing a tunable polymer membrane as described herein; and tuning the tunable polymer membrane with a first tuning method, thereby facilitating a first optical transition of the tunable polymembrane to a first tuning state.

The method can further comprise tuning the tuned polymer membrane with a second tuning method, thereby facilitating a second optical transition to a second tuning state.

The first tuning method can be the application of a mechanical force, and the first optical transition is transparent to opaque.

The second tuning method can be application of a solvent and drying the membrane, and the second optical transition is opaque to transparent.

Methods as described herein can further comprise initiating a tuning cycle wherein the first tuning state, second tuning state, or both are cycled for more than one cycle.

The tuning cycle can alter the optical transmission of the tunable membrane from below 94% to above 98% or above 98% to below 94%.

The application of force can be with a PDMS stamp comprising uncured PDMS oligomers configured to diffuse to the tunable polymer membrane upon the application of force with the PDMS stamp on the tunable membrane.

The first tuning method can be selected from the group consisting of applying a force or immersing in a solvent and drying.

The first tuning method can be selected from the group consisting of applying a force or immersing in a solvent and drying the membrane.

The first tuning method and second tuning method can be different.

The solvent can be ethanol or hexane.

Methods of tuning a tunable polymer membrane can further comprise: providing a tunable polymer membrane, wherein the tunable polymer membrane is fabricated by forming at least one silica layer with silica nanoparticles ($SiO_2$ nanoparticles with a diameter of about 100 nm to about 10,000 nm in an embodiment), transferring the at least one silica layer (which is a monolayer of colloidal silica crystals in an embodiment) onto at least one first surface of one or more substrates (which can comprise glass according to an embodiment), creating a volume between the first surface and at least one opposing second surface of a second substrate, adding a monomer composition (which can comprise comprises polymerized polyethylene glycol diacrylate (PEGDA), polyethylene glycol (600) diacrylate (PEGDA 600), ethoxylated trimethylolpropane triacrylate (ETPTA), ethoxylated (20) trimethylolpropane triacrylate (ETPTA 20), or a combination thereof) into the volume between the opposing first and second surfaces, polymerizing the monomer composition with a polymerization method to form a tunable polymer membrane, and removing the at least one silica layer on the one or more substrates with the first solvent (2% hydrofluoric acid in an embodiment). The fabrication method that creates the provided tunable polymer membrane can further comprise washing the tunable polymer membrane with a second solvent after removing the silica layers and can further comprise transferring the at least one silica layer onto at least one second surface of the second substrate; and tuning the tunable polymer membrane with a first tuning method, thereby facilitating a first optical transition of the tunable polymembrane to a first tuning state.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

FIG. 6 depicts a photograph of a polydimethoxysilane (PDMS)-stamped nanoporous ethoxylated trimethylolpropane triacryate (ETPTA)/polyethylene glycol diacrylate (PEGDA) membrane.

FIG. 7A depicts a top-view scanning electron microscope (SEM) image of the high-glare region of the embodiment of the present disclosure shown in FIG. 6.

FIG. 7B depicts a top-view SEM image of the low glare region of the embodiment of the present disclosure shown in FIG. 6.

FIG. 10A depicts a top-view SEM image of the clear region of the embodiment of the present disclosure shown in FIG. 9.

FIG. 10B depicts a top-view SEM image of the glare region of the embodiment of the present disclosure shown in FIG. 9.

FIG. 11 illustrates normal-incidence optical transmission spectra obtained from an embodiment of a polymeric membrane cyclically pressed and dried out of ethanol.

FIGS. 13A-13C depict a schematic illustration of the process for achieving switchable antireflection properties of a nanoporous AR coating.

FIG. 13A shows a polyacrylate film with 110 mm nanopores showing good AR performance. FIG. 13B shows that when a PDMS blow without uncured oligomers were placed on the sample in FIG. 13A as indicated by the dotted rectangle, no degradation of AR performance occurred. FIG. 13C shows that when a PDMS block with ~10 wt. % PDMS oligomers was placed on the coating, the printed region became highly reflective. FIG. 13D shows that after a hexane was, the printed region in FIG. 13C recovered the original suitable AR performance.

FIG. 15A shows optical transmission measurements during 5 infusion-hexane wash cycles. FIG. 15B shows cyclic change in light transmittance at 500 nm wavelength during 5 switching cycles.

FIGS. 16A-16D are x-ray photoelectron spectroscopy (XPS) spectra (FIG. 16A) and the corresponding elemental compositions of an intact polyacrylate AR coating sample (FIG. 16B), and the sample PDMS infusion (FIG. 16C) following by a brief hexane wash (FIG. 16D).

FIGS. 17A and 17B are top and cross-sectional views of an intact nanoporous AR coating according to the present disclosure. FIGS. 17C and 17D show the sample of FIGS. 17A-B after a PDMS oligomer infusion. FIGS. 17E and 17F show the sample of FIGS. 17C and 17D after a hexane wash.

DETAILED DESCRIPTION

Figure 1:
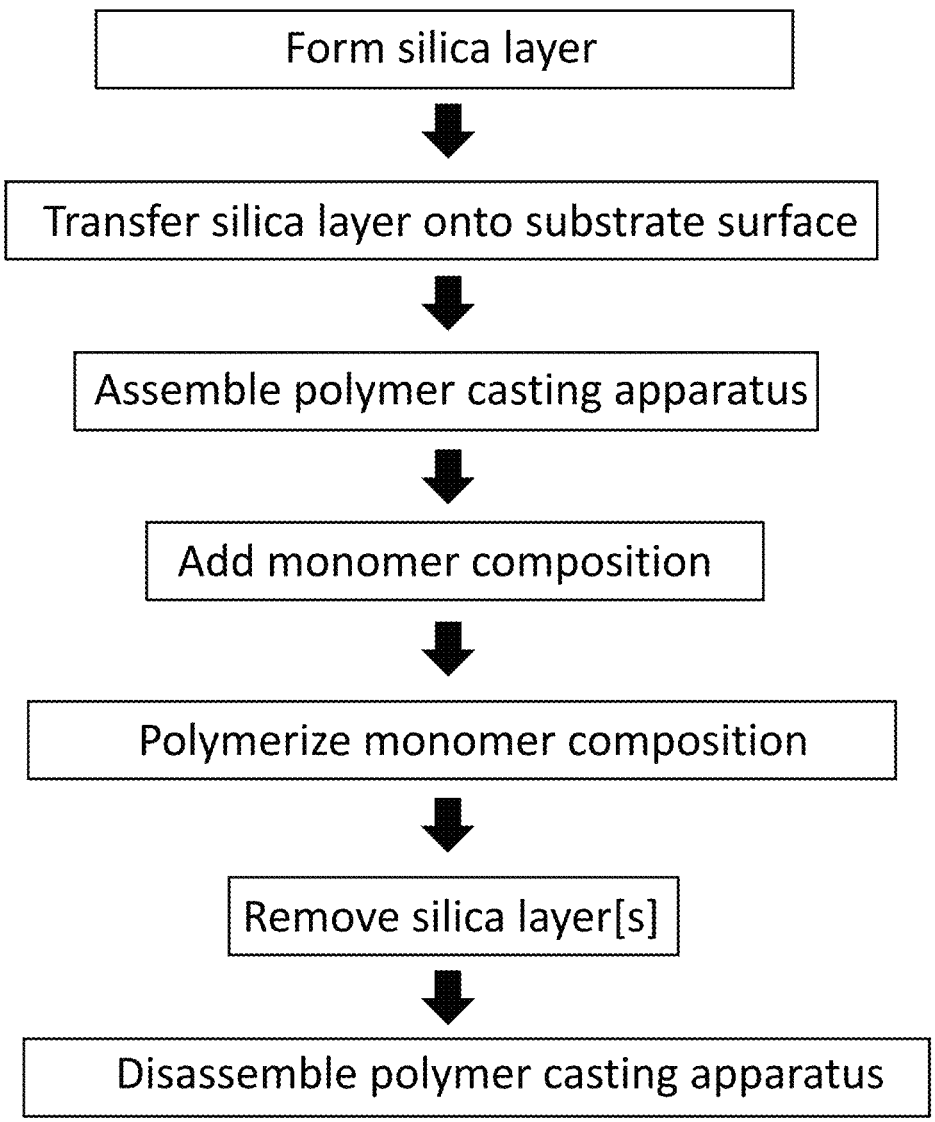
FIG. 1 illustrates an embodiment of a method for fabricating nanoporous polymer membranes using a silica monolayer template.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, inorganic chemistry, material science, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmosphere. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DISCUSSION

Embodiments of the present disclosure provide for methods and compositions of tunable nanoporous antireflection coatings. Tunable nanoporous antireflection coatings as described herein can be enabled by shape memory polymers.

Anti-reflection (AR) coatings are widely used in a spectrum of optical and optoelectronic devices. Applications of AR coatings can be found in examples such as: display monitors, car dashboards, optical lenses, photodiodes, and solar cells. Currently used traditional quarter-wavelength antireflection coatings can only support passive operations. With the recent development of many smart devices, there is an urgent need to develop smart optical coatings that can regulate the light transmission and reflection. Tunable antireflection coatings that can change the optical transmission and reflection are therefore important optical components for developing next generation smart optical and optoelectronic devices. Unfortunately, there are only very limited numbers of technologies available that enable tunable antireflection coatings. One previous approach is using tedious layer-by-layer self-assembly of polyelectrolytes to achieve antireflection tunability by controlling the open and closed states of nanopores. Unfortunately, this approach only works in aqueous solutions by tuning the pH values of the solution.

Described herein is a new methodology for achieving tunable antireflection using common shape memory polymers and/or their copolymers. It was discovered and described herein that a unique nanoporous structure can be enabled by a simple and scalable nanoparticle self-assembly technology. This technology can result in unusual "cold" programming and subsequent room-temperature recovery, which can be cycled, for a large variety of polymers. The tunable antireflection operations are described herein can be performed in a variety of environments, for example in both air and liquid solvents. The flexibility of the methods and compositions are described herein could greatly expand the application scopes of new, tunable, antireflection coatings for existing and next generation optics and optoelectronics.

Methods and compositions as described herein can generate novel smart optical coatings and optical surfaces with unique tunable antireflection properties. These tunable antireflection coatings can find important applications in regulating light transmission and reflection for a wide range of products, ranging from smart windows for energy-efficient building to brightness-adjustable displays.

Figure 2:
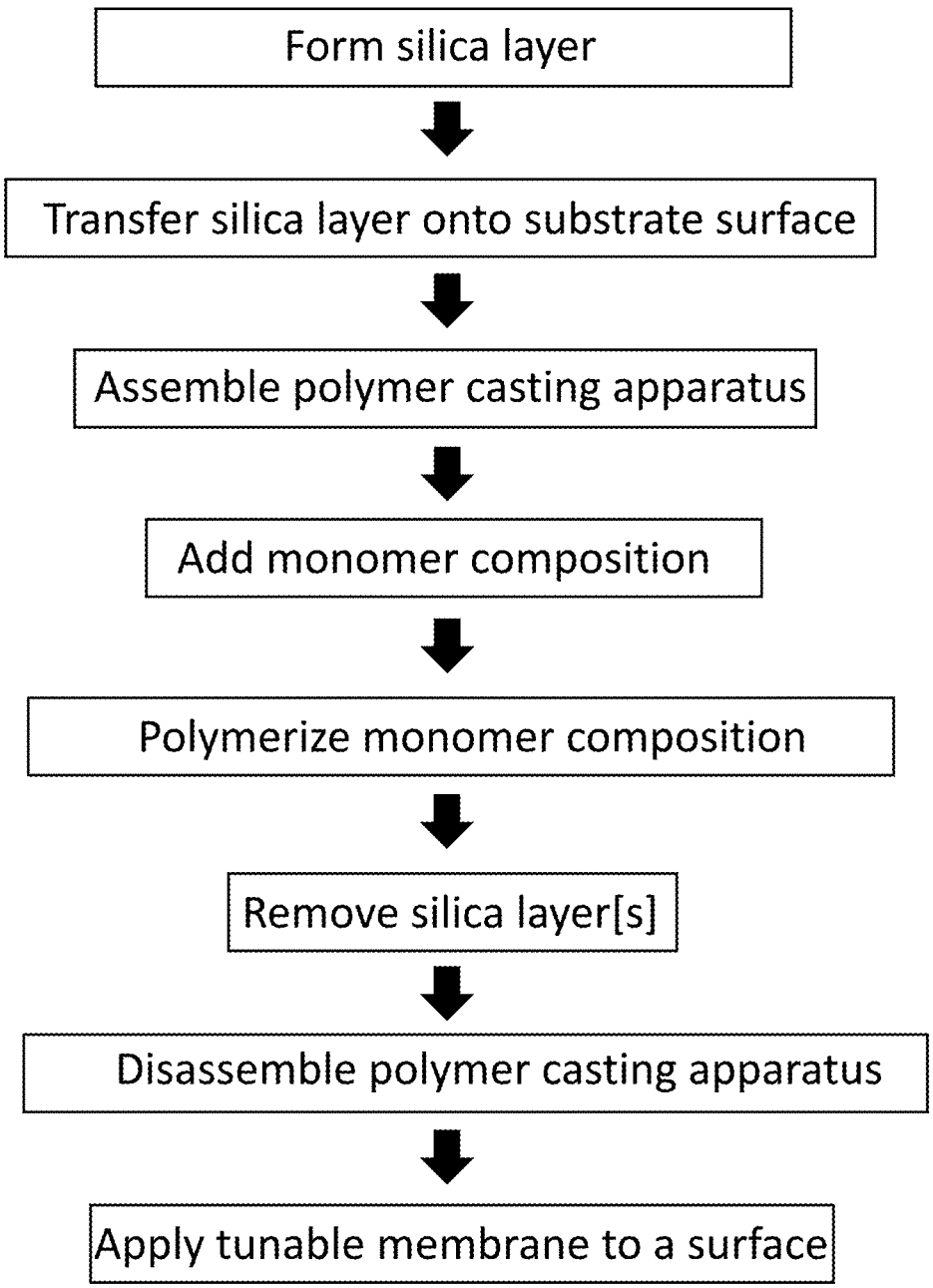
FIG. 2 illustrates a second embodiment of a method for fabricating nanoporous polymer membranes using a silica monolayer template.
Figure 3:
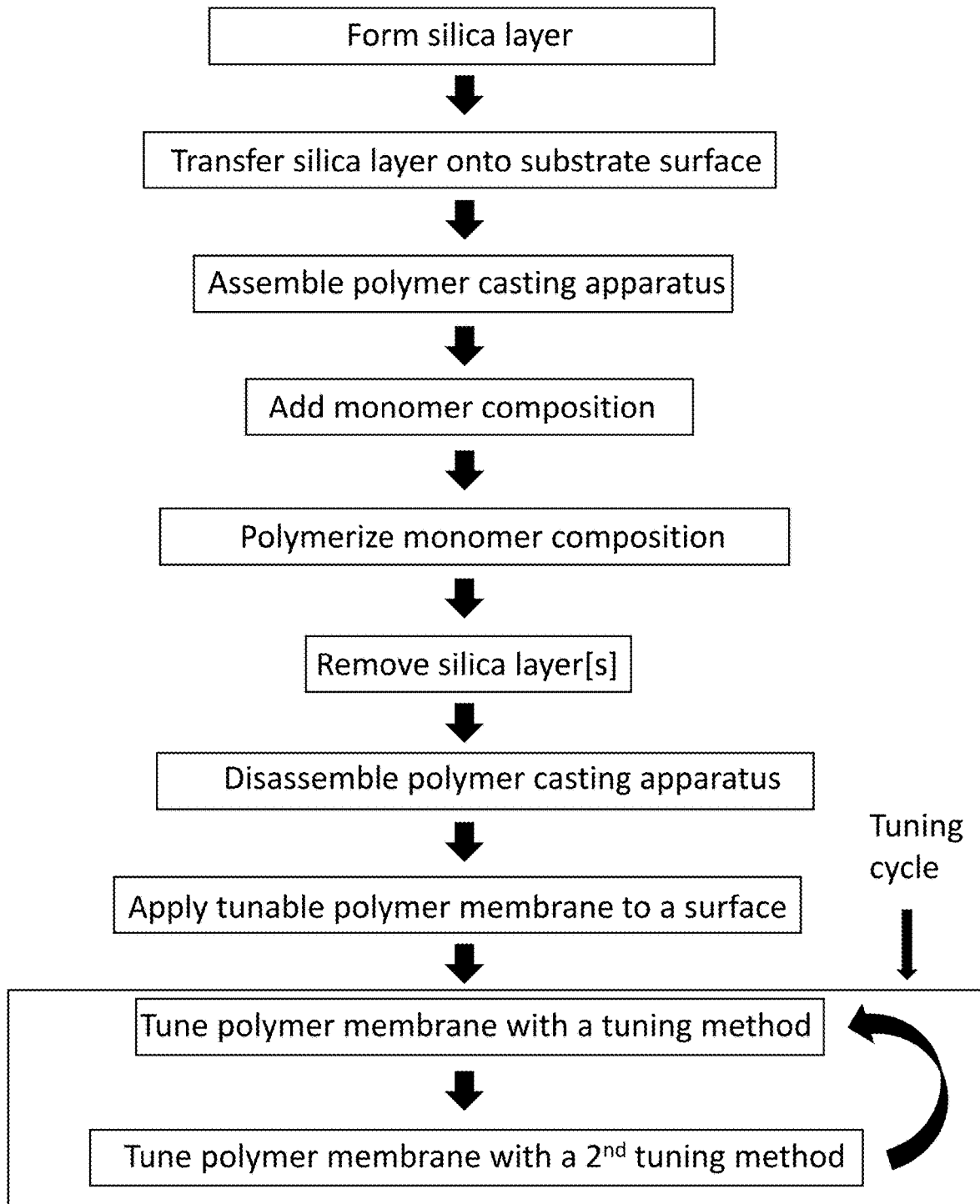
FIG. 3 illustrates a third embodiment of a method for fabricating nanoporous polymer membranes using a silica monolayer template.
Figures 4A, 4B, 4C:
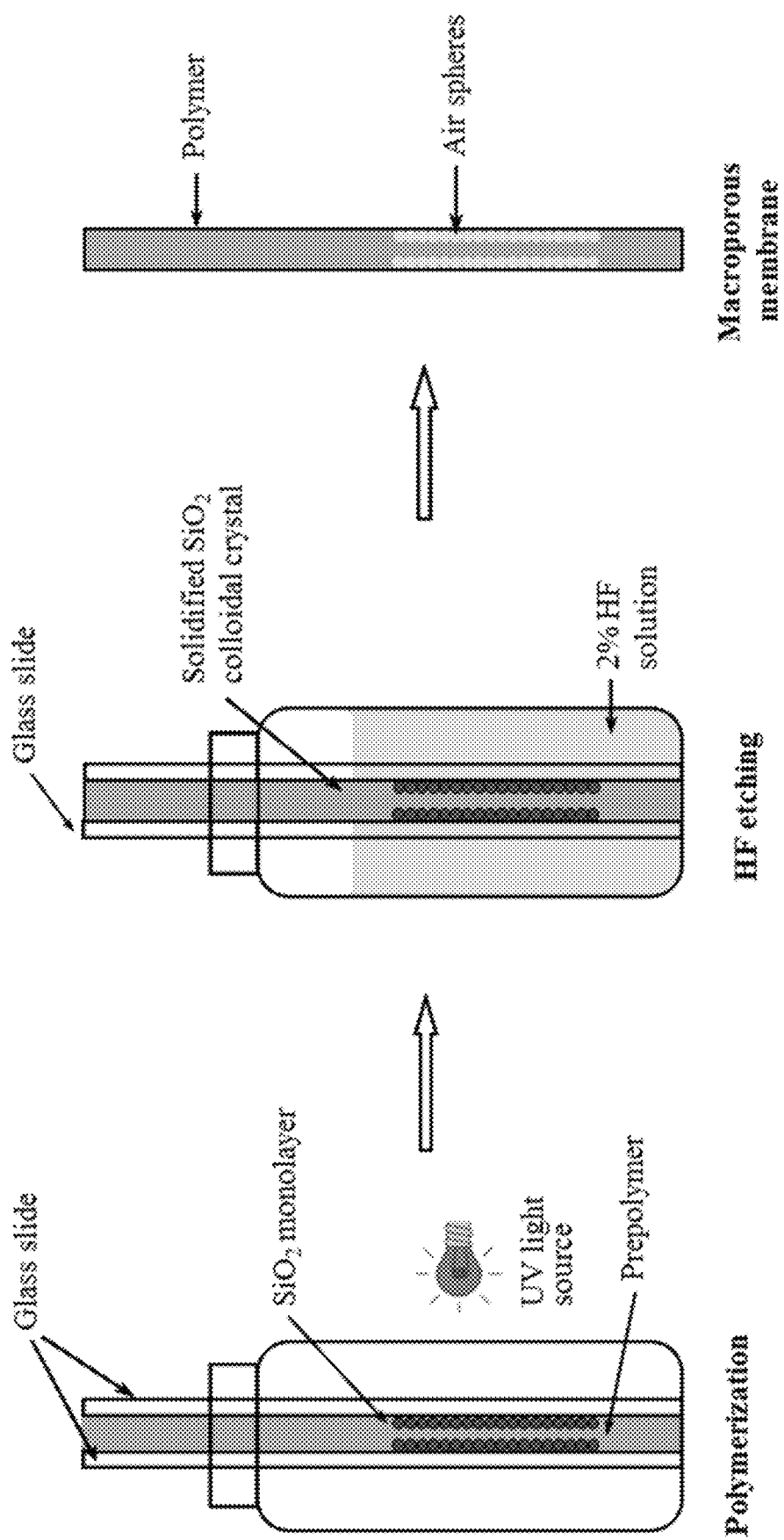
FIGS. 4A-4C illustrate a fourth embodiment of a method for fabricating nanoporous polymer membranes using a silica monolayer template, comprising polymerization (FIG. 4A), etching (FIG. 4B), and formation of the final product (FIG. 4C).

Described herein are methods and compositions for preparing tunable antireflection coatings. FIGS. 1-3 are flowcharts depicting embodiments of methods described herein. FIGS. 4A-4C show a further embodiment of a method for fabricating nanoporous polymer membranes using a silica monolayer template. As illustrated in FIGS. 4A-4C, a method can comprise polymerization (FIG. 4A), etching (FIG. 4B), and formation of the final product (FIG. 4C). In an embodiment, a method of forming a tunable antireflection coating can include forming (e.g., self-assembled) a colloidal monolayer of particles (e.g., silica) on the surface of a substrate.

In an embodiment, the colloidal monolayer of particles can be formed on the substrate by disposing the particles in a first solution (e.g., water) so that the particles cover the surface of the first solution. In an embodiment, the particles can be put into a second solution (e.g., ethylene glycol) and then disposed into the first solution. In an embodiment, the second solution causes the particles to disperse evenly across the surface of the first solution via colloidal self-assembly.

Once the particles are disposed on the surface of the first solution, the substrate can be removed from the first solution so that the particles form a colloidal monolayer on the surface of the substrate. In an embodiment, the particles can be disposed on the substrate as an ordered colloidal monolayer (e.g., a hexagonal ordering). The substrate can be disposed in the first solution prior to the addition of the particles to the first solution or the substrate can be disposed in the first solution after the addition of the particles to the first solution.

In an embodiment, the first solution can be water, ethanol, butanol, or a mixture thereof. In an embodiment, the second solution can be ethylene glycol, toluene, benzene, or a mixture thereof. In an embodiment, the first solution is water and the second solution is ethylene glycol. In an embodiment, the substrate is glass. The monolayer can be assembled across a surface of the substrate, either partially or across the whole surface.

In an embodiment, a Langmuir-Blodgett (LB) method or modified LB method can enable the formation of ordered colloidal silica monolayers on the substrate. Silica particles with a diameter of about 100 to 10,000 nm, which can be dispersed in ethylene glycol, can be added drop wise to the surface of water contained in a large glass beaker or similar container. The particles can be seen floating on the surface of the water. They can form crystalline structures on the surface of the water that can be observed due to the brilliant colors caused by Bragg diffraction of visible light. Once the entire surface of water is covered with silica particles it is left for about 10 minutes for the silica particles on the surface to form a homogeneous layer on the surface of the water. A substrate or surface of a substrate can then be slowly withdrawn from the beaker at a rate of about 0.5 mm/min. As the substrate or surface of the substrate is withdrawn it can be coated with a monolayer of silica particles. In an embodiment, the substrate is glass. In an embodiment, the substrate is a glass slide.

After the silica layer is applied, a polymer casting apparatus can be assembled. One or more substrates can be coated with a layer of silica as described above. In an embodiment, two or more substrates or a surface of two or more substrates can be coated with a silica layer. In an embodiment of a polymer casting apparatus, two or more coated substrates can be positioned in a container configured to hold a solvent in a sandwich-type configuration so that at least a surface of a first substrate coated with silica opposes a surface of a second substrate, uncoated or coated with silica. Other configurations can be realized with more than two coated substrates. In an embodiment, the coated substrates of the polymer casting apparatus are silica-coated glass.

In an embodiment, after assembly of the polymer casting apparatus, monomers or a monomer composition can be put in a space between two or more opposing silica coated surfaces of the two or more silica coated substrates. Monomers or a monomer composition that can form a polymer, a desired polymer, or a pre-determined polymer are described in more detail below.

After monomers are placed in the space, they can be polymerized by a polymerization method to form a tunable polymer membrane. The polymerization method can be photo-polymerization, wherein the monomers are polymerized by the application of light. In an embodiment, the light can be UV light and can be applied for a period of time.

The tunable polymer membrane can be made of a monomer, a monomer composition, or a polymer. In some embodiments, the monomers, monomer composition, or polymer can be a viscous and/or elastic polymer. The tunable polymer membrane can additionally be characterized by weak intermolecular forces. Further, the tunable polymer membrane can have a low Young's modulus and can therefore change shape easily. In some embodiments, the tunable polymer membrane can have a high failure strain when compared with other materials.

Following polymerization, the silica layer can be removed from the membrane and the membrane optionally washed. In an embodiment, the silica layer is removed by a solvent. In an embodiment, the silica is removed by 2% hydrofluoric acid (HF) aqueous solution. In an embodiment, the membrane can be washed by a wash solvent. In an embodiment, the wash solvent can be deionized water. The silica layer can be removed by a solvent that is placed in the container of the polymer casting apparatus in an embodiment. Removal of the silica layer can create nanopores in the polymer. The polymer or tunable polymer membrane can be nanoporous following removal of the silica layer.

In an embodiment, after removal of the silica monolayer (and optional wash), the polymer casting apparatus can be disassembled and the polymer membrane separated from the substrates that were previously silica coated. In an embodiment, the polymer membrane can be a tunable antireflective membrane and can be transferred to any surface that can be partially or fully transparent.

The tunable polymer membrane can be configured to be modified such that the level of transparency of the tunable polymer membrane can vary in response to one or more mechanical forces applied to the tunable polymer membrane. One or more mechanical forces can alter the transparency by changing the shape or configuration of the nanopores in the tunable polymer membrane. The amount of force from one or more mechanical forces can be predetermined or random; it can be continuous or variable over time; it can be across the entire surface of the tunable polymer membrane or only at partial locations, either predetermined or random.

Additionally, the one or more mechanical force(s) can be applied to the tunable polymer membrane at a single point on the tunable polymer membrane, a single end of the tunable polymer membrane, multiple ends of the tunable polymer membrane, multiple points on the tunable polymer membrane, and/or in any other configuration that can cause the tunable polymer membrane to be structurally modified to change the transparency level of the tunable polymer membrane. In some embodiments, tensile and/or compression force(s) can be applied to the tunable polymer membrane. In some embodiments, the mechanical force(s) can be applied over a tunable polymer membrane having dimensions of about 1 inch by about 1 inch. The one or more mechanical forces can be applied by anything capable of applying a mechanical force. In an embodiment, the one or more mechanical forces is applied with a stamp of polydimethoxysilane (PDMS).

The mechanical force applied to membranes as described herein can transfer uncured small molecules (oligomers) from the material that is used as the stamp to the surface of the membrane that is stamped, thereby facilitating an optical transition. In an embodiment according to the present disclosure, uncured PDMS oligomers from the PDMS stamp diffuse from the stamp to the tunable membrane upon the application of mechanical force. The diffusion of such hydrophobic PDMS oligomers changes the hydrophobicity of the macropores of the membrane that leads to a great change in the capillary pressure induced by water evaporation from the macropores The transparency of the tunable membrane can be altered by drying after application of or immersion in a solvent. The solvent can be water in an embodiment. In an embodiment, the solvent can be ethanol or another alcohol. The solvent can be another organic solvent, for example hexane. A solvent can alter the transparency by changing the shape of the nanopores in the tunable polymer membrane through a mechanism such as capillary action.

Transparency of the tunable polymer membrane can be cycled, or in other words is reversible. A transparent tunable polymer membrane as described herein can be rendered opaque by one or more mechanical forces or solvents, and the process can be cycled back or reserved. An opaque tunable polymer membrane as described herein can be made transparent by one or more mechanical forces or solvent[s], and the process can be cycled back or reversed. Tuning cycles also known as cycles of transparency as described herein can be repeated many times without altering the light transmitting properties of the tunable polymer membrane.

In an embodiment of the present disclosure, a tuning cycle for tunable membranes as described herein is described where pressure is applied to a membrane or portion of a membrane with a stamp, facilitating a first optical transition from a transparent to an opaque state, and then the membrane can be washed with a solvent and then dried, facilitating a second optical transition from opaque state back to the original transparent state. This can be a binary transition (transparent to opaque or opaque to transparent), or can be varying degrees of transition depending on the stamp, the stamp pressure, duration of the application of mechanical force by the stamp, the solvent, and/or the solvent wash time.

The methods and compositions described herein can use a large variety of shape memory polymers to form the tunable polymer membrane depending on the desired configuration of the tunable polymer membrane. Shape memory polymers as described herein can be elastic or glassy.

An elastic polymer can be a polymer that has a glass transition temperature lower than or close to room temperature. In an embodiment, a polymer as used herein can have a $T_g$ of about −40° C. In an embodiment, a copolymer of ETPTA 20 and PEGDA 600 (with ratio from 1:1 to 1:6) is elastic at ambient conditions.

A "glassy" polymer can be a polymer or copolymer with glass transition temperature higher than room temperature. A "glassy" polymer can be optically transparent. A glassy polymer as used herein can have a glass transition state ($T_g$) higher than room temperature. In an embodiment, a glassy polymer has a $T_g$ of about 120° C. In an embodiment, a glassy polymer is poly(methyl methacrylate) with a typical $T_g$ of about 100° C.

In an embodiment, a polymer or tunable polymer membrane as used herein can be polymerized polyethylene glycol diacrylate (PEGDA), polyethylene glycol (600) diacrylate (PEGDA 600), ethoxylated trimethylolpropane triacrylate (ETPTA), ethoxylated (20) trimethylolpropane triacrylate (ETPTA 20), individually or in combination. In an embodiment, a polymer as used herein can be polymerized monomers of polyethylene glycol diacrylate (PEGDA), polyethylene glycol (600) diacrylate (PEGDA 600), ethoxylated trimethylolpropane triacrylate (ETPTA), ethoxylated (20) trimethylolpropane triacrylate (ETPTA 20), individually or in combination. In an embodiment, a polymer as used herein is an elastic membrane comprising PEGDA 600 and ETPTA 20. A coating as described herein can be an elastic membrane. A coating as described herein can be an elastic membrane comprising PEGDA and ETPTA. A coating as described herein can be an elastic membrane comprising PEGDA 600 and ETPTA 20. In an embodiment, a glassy polymer can be used to form a membrane for a tunable antirelective coating. In an embodiment, ETPTA can be used to form a membrane for a tunable antireflective coating. In an embodiment, photocurable, glassy poly(methyl methacrylate) (PMMA) can be used to form a membrane for a tunable antireflective coating. In an embodiment, glassy copolymers including trifunctional acrylated urethane and tripropylene glycol diacrylate (TPGDA) can be used to form a membrane for a tunable antireflective coating.

In certain aspects, the tunable shape memory polymer can be comprised of other shape memory polymers (e.g., polyurethane-based copolymers) that show enhanced mechanical stability/durability with higher glass transition temperatures (up to 120° C.) and Young's moduli (up to ~3 GPa).

A silica nanoparticle monolayer can be used as a structural template for fabricating nanoporous polymer membranes with antireflection properties. The templating layer can also be multilayers of silica nanoparticles assembled by various methodologies, such as spin coating, dip coating, doctor blade coating, and so on. In an embodiment, the silica nanoparticles can be self-assembled or not be self-assembled and/or possess long-range ordering or not possess long-range ordering. Self-assembled silica nanoparticle monolayers can be used as described herein and can be created by a variety of methods, for example a simple and scalable Langmuir-Blodgett method as described above. As used and described herein, silica nanoparticles can be used for silica nanoparticle monolayers. Silica nanoparticles can be $Si_xO_yH_z$, synthesized by various methodologies, including the well-established Stöber method.

In an embodiment, the silica nanoparticles can be about 100 nm to about 10,000 nm. In an embodiment, silica nanoparticles are silicon dioxide ($SiO_2$). In an embodiment, a composition of silica nanoparticles has an average diameter of about 100 nm/particle. Silica nanoparticles as used herein can have a diameter of about 100 nm. In an embodiment, silica nanoparticles as used herein can be $SiO_2$ nanoparticles with a diameter of about 100 nm each.

The optical reflection of the membranes described herein can be fine-tuned by simple structural manipulation at ambient conditions. In this regard, a membrane as described herein can be considered tunable. When the nanoporous structure is in its original state, low optical reflection of light can be easily recognized. By contrast, once the nanoporous structure is distorted, high optical reflection can result. Besides optical configurability, m are designed to exhibit cyclical optical transitions and, cycles of optical transition (low optical reflection to high optical reflection, or high optical reflection to low optical reflection) can be repeated many times (>100) with little to no sign of degradation. Additionally, the shape memory polymers used herein, which have very broad thermomechanical properties (e.g., glass transition temperature ranges from −40° C. to 120° C.), can exhibit unusual "cold" programming behaviors. In other words, the deformation and the recovery of the nanoporous structure can be performed at ambient (at or about room temperature) conditions without cooling or heating. This is quite different from and in stark contrast to traditional thermoresponsive shape memory polymers.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Example 1

Figure 5A:
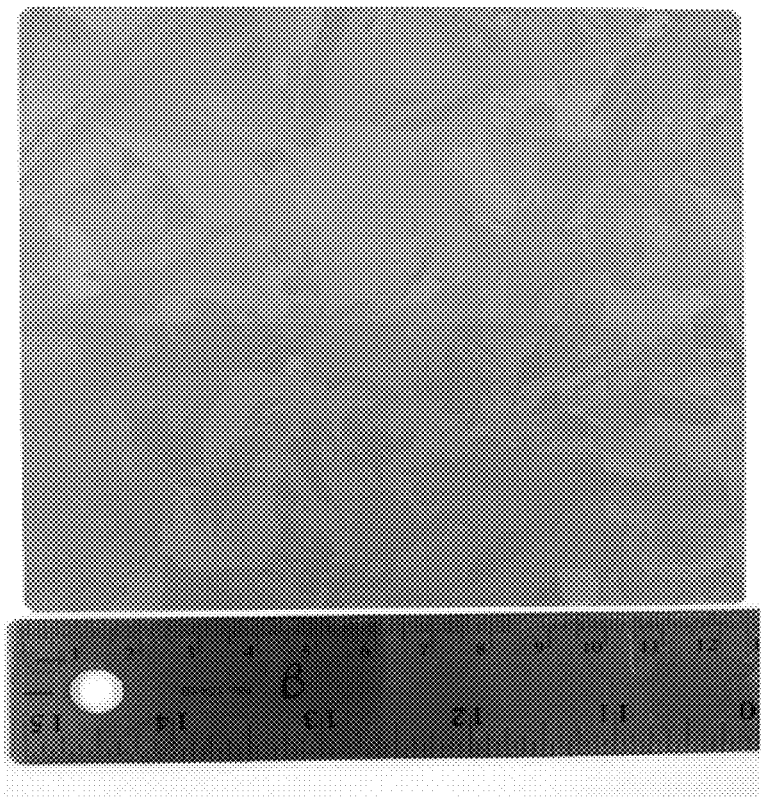
FIG. 5A is a photograph showing an example of the silica coating method described herein. A commercial solar-grade multicrystalline silicon wafer (substrate) coated with silica particles by LB method described herein is shown.
Figure 5B:
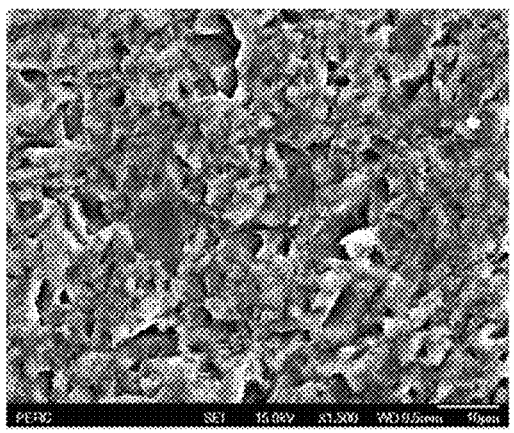
FIG. 5B shows a scanning electron microscopy image of the surface of the example shown in FIG. 5A.
Figure 5C:
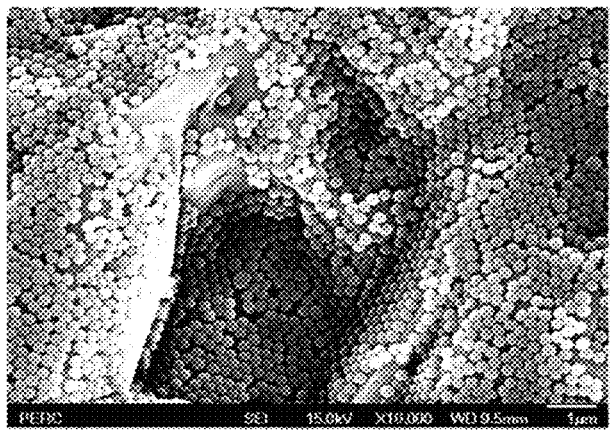
FIG. 5C is a magnified image of the sample of FIG. 5A, where the hexagonal ordering of monolayer silica particles is clearly seen from these electron microscopy images.

An example of coating a surface with a silica monolayer as described can be seen in FIGS. 5A-5C. A photograph of a substrate (a commercial solar-grade multicrystalline silicon wafer) coated with silica particles by LB method is shown in FIG. 5A. The top half of the image is the uncoated wafer and the bottom half is the coated wafer. It is apparent that the silica coating is quite uniform over the whole coated area. The LB method described above can be easily applied to coat a whole substrate, a whole surface of a substrate, a substrate in part, or a surface of a substrate in part in a continuous manner. FIG. 5B shows a scanning electron microscopy image of the surface of the substrate covered in silica particles in FIG. 5A. FIG. 5C is a magnified image of the same sample in FIG. 5A. The hexagonal ordering of monolayer silica particles is clearly seen from these electron microscopy images.

Example 2

Described herein is a methodology for fabricating smart, tunable antireflection coatings by using a large variety of shape memory polymers and resulting compositions thereof. Demonstrated herein is a know-how of tuning the optical transmission and reflection properties by controlling the nanostructures of templated nanopores at ambient conditions. This method is not only applicable to "rubbery" polymers, but can also be used to "glassy" polymers.

In an embodiment, monolayer colloidal crystals consisting of 100 nm diameter silica nanoparticles can be assembled by using an assembly method, such as a simple and scalable Langmuir-Blodgett method. The colloidal silica nanoparticles can be first assembled at an interface of air and water and subsequently transferred onto a glass substrate. After coating the glass substrate, various polymer monomers can be put in a "sandwich cell" consisting of the coated glass and a bare glass substrate. The monomers can then be polymerized, by a method such as photo-polymerization. The silica nanoparticles can then be removed by dissolving in a 2 vol % hydrofluoric acid aqueous solution and finally rinsed with deionized water. FIGS. 4A-4C show an embodiment of a procedure for fabricating nanoporous polymer membranes by using a silica monolayer as a structural template. In embodiments such as that in FIGS. 4A-4C, methods can comprise polymerization (FIG. 4A), etching (FIG. 4B), and formation of the final product (FIG. 4C). The silica monolayer can be a self-assembling monolayer.

Methods described herein can tune the structure of various nanoporous polymeric membranes with very different thermomechanical properties under ambient conditions, thereby tuning properties relating to light reflectance. When some elastic membranes, such as a copolymer of polyethylene glycol (600) diacrylate (PEGDA 600) with ethoxylated (20) trimethylolpropane triacrylate (ETPTA 20), are dried out of water, the templated nanopores can collapse because, at least in part, of the large capillary pressure created by the evaporation of water from the nanopores. The resulting membranes with deformed nanopores can show high optical reflection. By contrast, the collapsed nanopores can be "pulled" back to their original spherical nanoporous state by stamping them with a block of polydimethoxysilane (PDMS). The recovery of the original, open nanopores can lead to reduced optical reflection of the membranes. FIG. 6 shows the reflection of an embodiment of a PEGDA 600-ETPTA 20 copolymer membrane with collapsed (dried out of water) and recovered (PDMS-stamped) nanopores. The antireflective properties of the membrane can be in line with the recovery of nanopores caused by PDMS stamping.

FIG. 6 depicts a photograph of an embodiment of a PDMS-stamped nanoporous ETPTA/PEGDA membrane. The topological examination was carried out using scanning electron microscope (SEM), shown in FIGS. 7A-7B. FIG. 7A represents a top-view SEM image of the high-glare region of the embodiment in FIG. 6, showing disordered nanopores. By contrast, FIG. 7B confirms that the low-glare region of the embodiment of FIG. 6 exhibits an ordered nanoporous structure.

Figure 8:
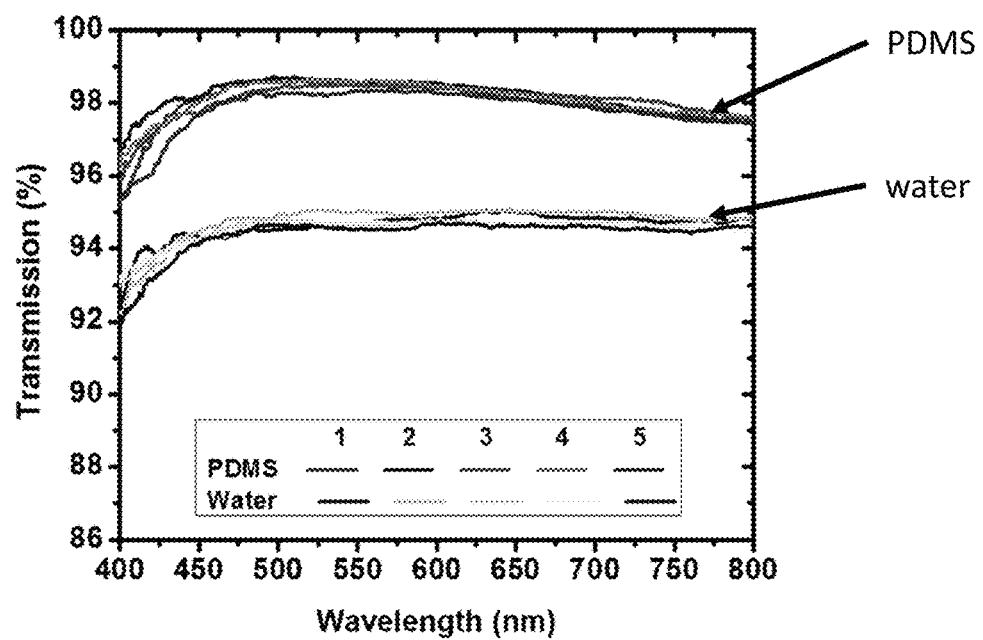
FIG. 8 illustrates normal-incidence optical transmission spectra obtained from an embodiment of a nanoporous ETPTA/PEGDA membrane cyclically stamped and dried out of water.

To demonstrate the durability and tunable antireflection properties of membranes described herein, cyclic optical measurements of an embodiment of a membrane between high and low optical transmission was performed as shown in FIG. 8. FIG. 8 shows normal-incidence optical transmission spectra that can be obtained from an embodiment of a nanoporous ETPTA/PEGDA membrane cyclically stamped and dried out of water. The resulting PDMS stamped area can show as high as 98% of transmission whereas the area directly dried out of water-only can be significantly lower.

Figure 9:
FIG. 9 shows an embodiment of a photograph of a hydraulically pressed ETPTA membrane templated from 100 nm silica nanoparticles.

Besides the above embodiment of an elastic polymer, which can have a glass transition temperature ($T_g$) of ~−40° C. (<<room temperature), the tunable antireflection technology and methods described herein can also be applied to a variety of "glassy" polymer. "Glassy" polymers can be polymers which have $T_g$ much higher than room temperature (e.g., ethoxylated trimethylolpropane triacrylate (ETPTA) with $T_g$ of 120° C.). FIG. 9 shows a photograph of an embodiment of a hydraulically pressed ETPTA membrane templated from 100 nm silica nanoparticles. FIG. 9 illustrates the reflection from an ETPTA membrane with mechanically deformed (hydraulically pressed, in the center) and original nanoporous structures (clear or transparent area surrounding the center square). The glare associated with the pressed region can be strong indication of the structure deformation for "glassy" polymers.

Top-view SEM images of the sample in FIG. 9 are shown in FIGS. 10A-10B. FIGS. 10A-10B shows top-view SEM images of the clear region (FIG. 10A) and glare region (FIG. 10B) of the embodiment show in FIG. 9. The SEM images can indicate a considerable transformation from the clear region (FIG. 10A) to the high-glare region (FIG. 10B) of the embodiment in FIG. 9. The SEM images confirm the deformation of the nanopores can be caused, for example, by the hydraulic pressing process.

Additional testing of the cyclical properties of the membrane was undertaken. FIG. 11 shows the comparison of the optical transmission between the original (open nanopores) and the deformed states. The experiments are performed to consecutively cycle (press and then dry) the deformed membranes out of ethanol, offering two optical states (high and low glare). FIG. 11 depicts normal-incidence transmission spectra obtained from an embodiment of a polymeric membrane cyclically pressed and dried out of ethanol.

Example 3

Figure 12:
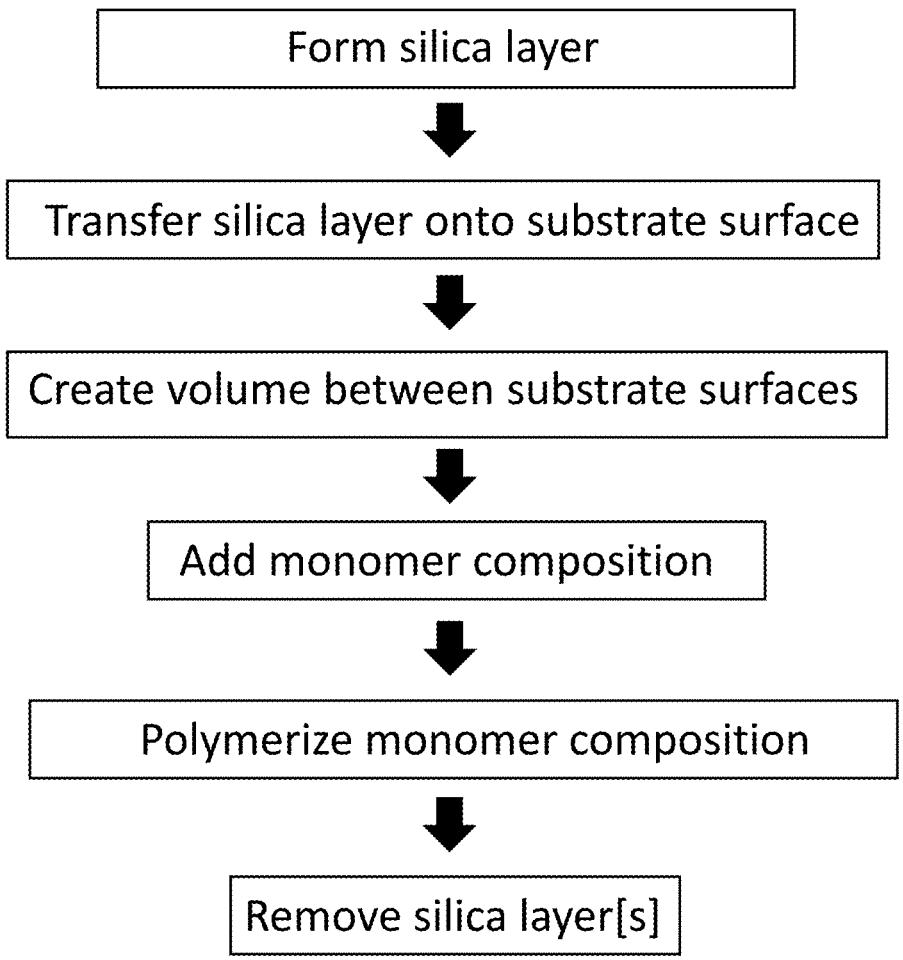
FIG. 12 illustrates an embodiment of a method for fabricating nanoporous polymer membranes using a silica monolayer template.

FIG. 12 depicts an embodiment of a method as described herein. The method of FIG. 12 can further comprise forming a silica layer with silica nanoparticles; and transferring the silica layer onto at least one surface of one or more substrates.

Example 4

In this example, embodiments of a simple polymer infusion process for controlling the antireflection (AR) and transmission properties of nanoporous polymer coatings prepared by a nanoparticle templating approach are described. The infusion of uncured polydimethylsiloxane (PDMS) oligomers from a PDMS block under mechanical pressure into monolayer nanopores induces the refractive index matching, leading to the loss of AR properties of the intrinsic nanoporous coating. The infused oligomers can be easily removed by a simple solvent wash (e.g., using hexane), resulting in the recovery of the good AR performance of the infused regions. Therefore, switchable antireflection coatings that could find many important applications in smart optoelectronic surfaces and dynamic windows have been achieved.

FIGS. 13A-13C show the schematic illustration of this polymer infusion process. Original nanoporous AR coatings were prepared by templating monolayer silica colloidal crystals assembled using a simple and scalable Langmuir-Blodgett technique. In short, silica nanoparticles with diameters ranging from 70 to 120 nm were first assembled at an air/water interface. The monolayer colloidal crystal floating on water was then transferred onto a glass substrate. The assembled silica colloidal crystals were then used as structural templates in replicating nanoporous AR coatings with both surfaces possessing ordered nanopores. Nearly all polymers including acrylates, polystyrene, polyurethane, and epoxy can be used according to this technique. When a solid PDMS block was placed on the AR coating and a small pressure was applied on the block, uncured PDMS oligomers in the block were squeezed into the interconnecting nanopores. Due to refractive index match caused by the infused oligomers, the printed regions lost the original good AR performance of empty nanopores. By simply dipping the infused coatings into common organic solvents, like ethanol and hexane, to remove the infused PDMS oligomers, the original AR performance of the printed regions was recovered.

Figure 14A:
FIGS. 14A-14D are photographs of a nanoporous AR coating film during an embodiment of the cyclic switching process as described herein.
Figure 14B:
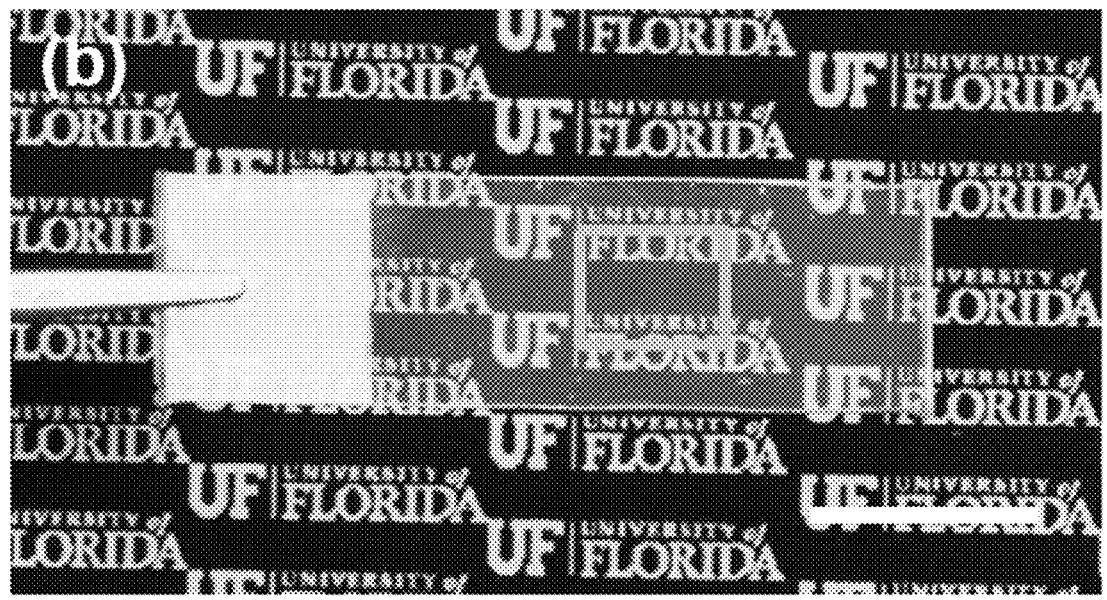
Figure 14C:
Figure 14D:

FIGS. 14A-14D are photographs of a templated nanoporous AR coating during a cyclic switchable process as described herein. The sample was prepared by templating self-assembled silica monolayer colloidal crystals consisting of 110 nm nanoparticles. The sample exhibits good AR performance as the underneath words are visible (FIG. 14A). In sharp contrast, the leftmost part of the sample does not have templated nanopores and therefore it is high reflective, impeding the readability of the words underneath it. When a cleaned PDMS block with no uncured oligomers in it was placed on the AR coating, no degradation in the AR performance was noticed (FIG. 14B). The uncured oligomers in this PDMS block were removed by a 24-hour hexane wash at room temperature. By contrast, when a PDMS with ~10 wt. % oligomer was pressed on the AR coating, the underneath regions immediately lost the original AR properties, leading to the highly reflective rectangular pattern shown in FIG. 14C. The recovery of the initial AR performance can be easily achieved by washing away the infused PDMS oligomers using a simple hexane wash (FIG. 14D).

Figure 15A:
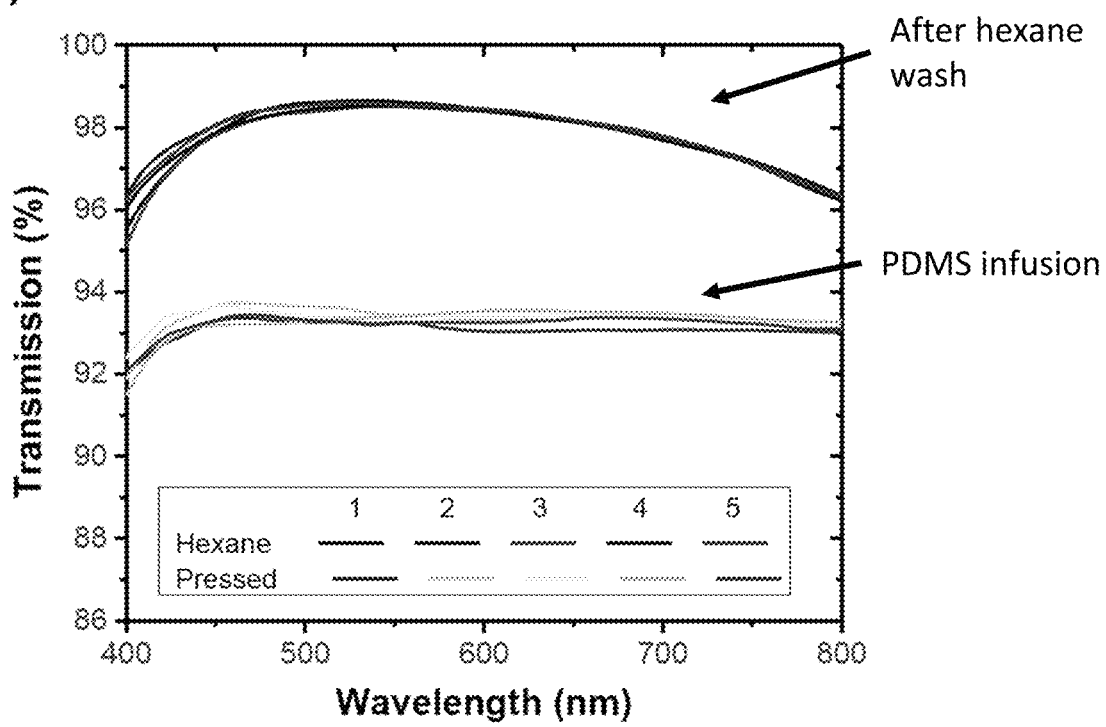
FIGS. 15A and 15B are graphs showing optical characterization of switchable AR properties.
Figure 15B:
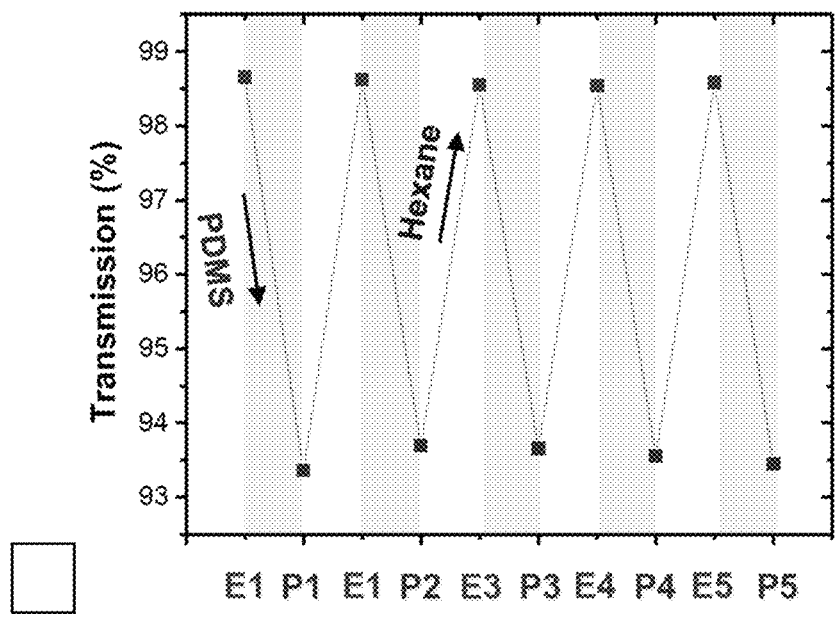

The cyclic AR performance of the switchable AR coatings can be characterized by optical transmission measurements. FIG. 15A compares the normal-incidence optical transmission spectra obtained from a nanoporous AR coating sample after 5-time PDMS infusion processes, followed by hexane wash after each infusion. It is apparent that all infused samples show high low light transmission; while the hexane-washed samples exhibit high transmission. This cyclic change in light transmission was further shown in FIG. 15B by comparing the transmittance at 500 nm wavelength during the above cyclic operations.

To confirm the PDMS oligomer infusion mechanism, X-ray photoelectron spectroscopy (XPS) elemental analysis was utilized. FIG. 16A compares the XPS spectra obtained from an intact polyacrylate nanoporous AR coating, and the sample polymer film after PDMS printing, followed by a brief hexane wash. The pie charts in FIGS. 16B-16D compare the elemental compositions of the final samples. It is clear that the intact polymer AR coating sample (FIG. 16B) contains only carbon and oxygen (hydrogen is not shown in the XPS spectrum). The PDMS-infused sample (FIG. 16C) contains ~7.73% silicon which was originated from the infused PDMS oligomers. The hexane-washed sample (FIG. 16D) still contains ~1.9% silicon as the brief hexane wash only partially removed the infused PDMS oligomers.

Figure 17B:
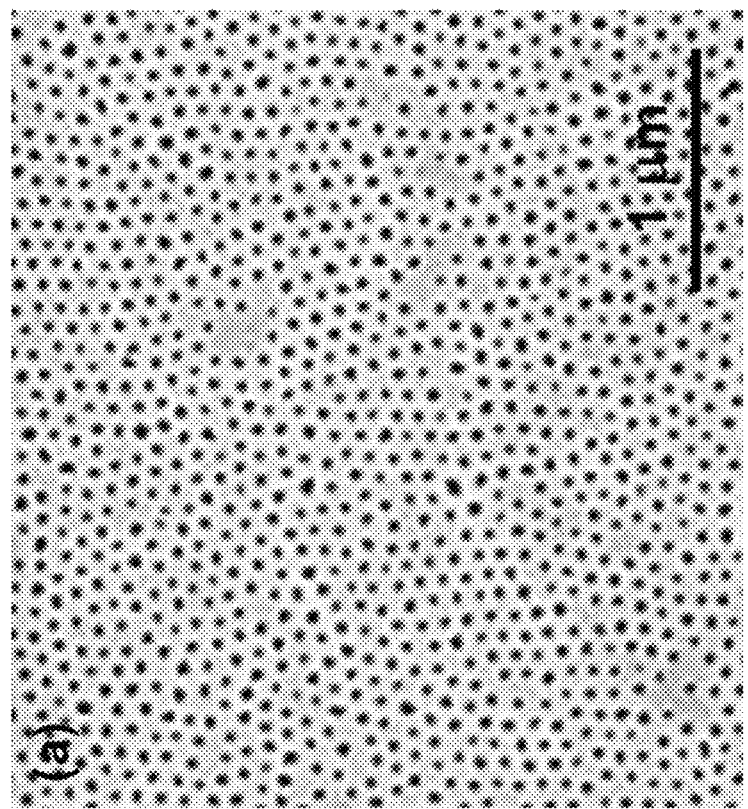
FIGS. 17A-17F are SEM images showing the structural changes during the cyclic infusion-washing process.
Figure 17A:
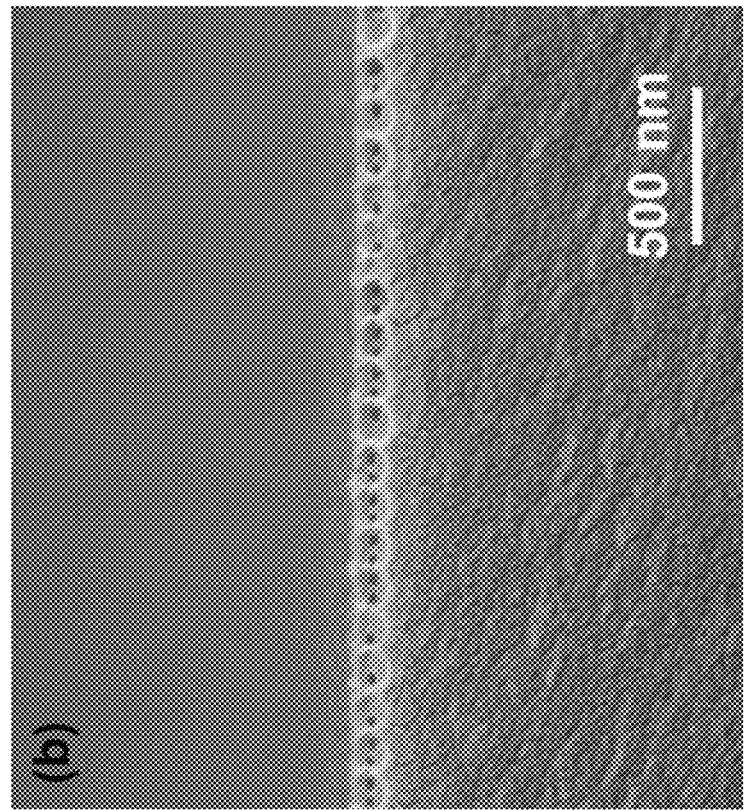
Figure 17D:
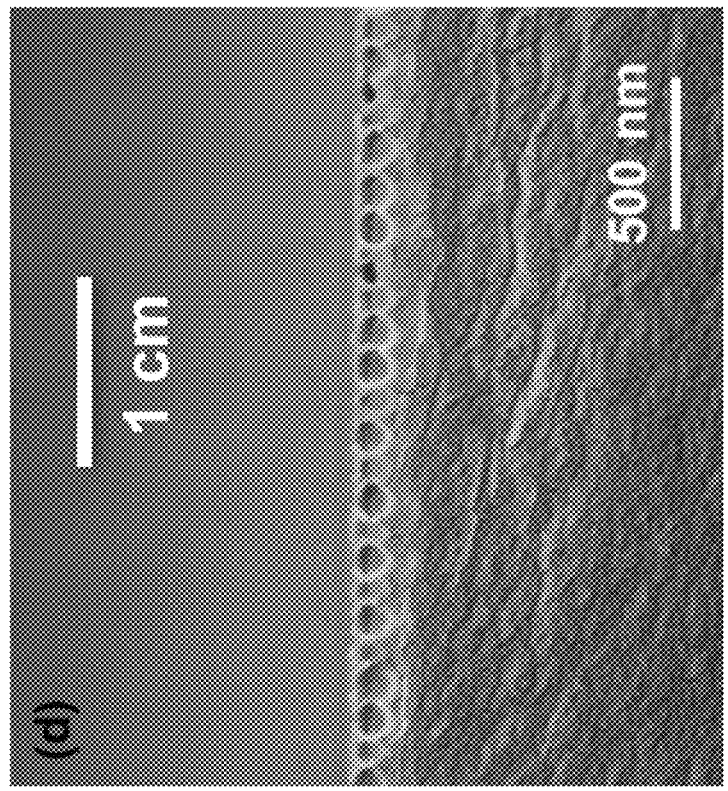
Figure 17C:
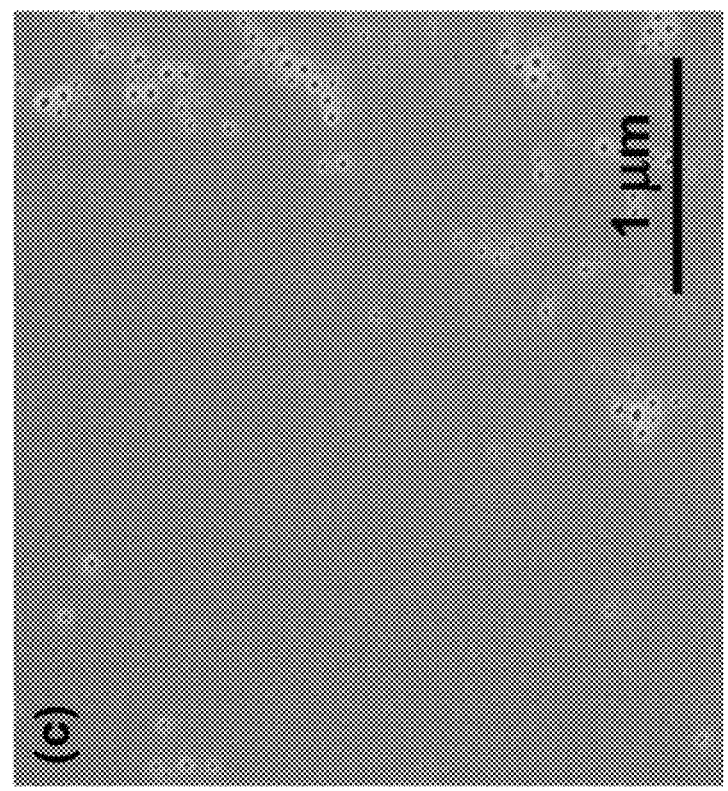
Figure 17F:
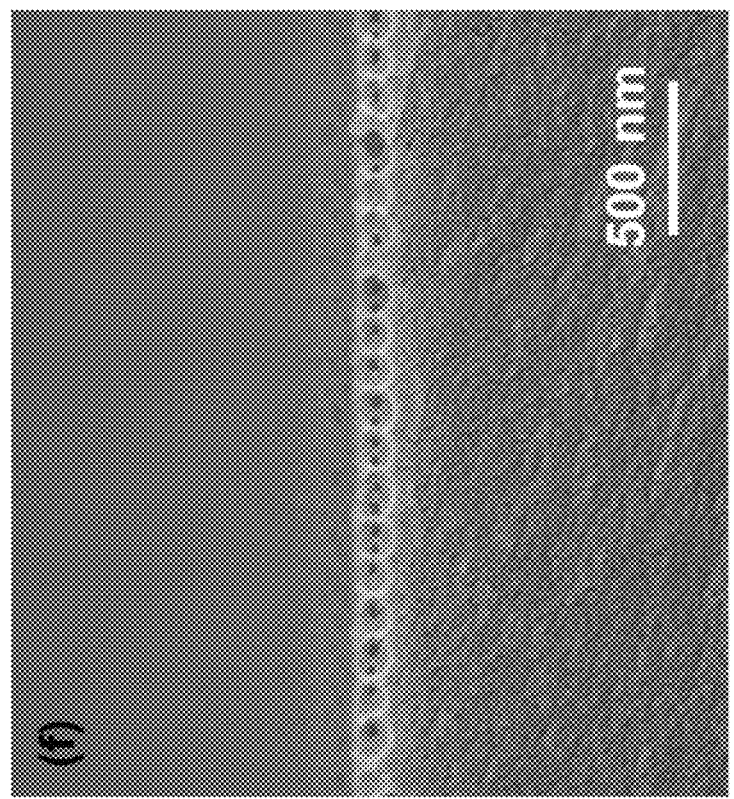
Figure 17E:
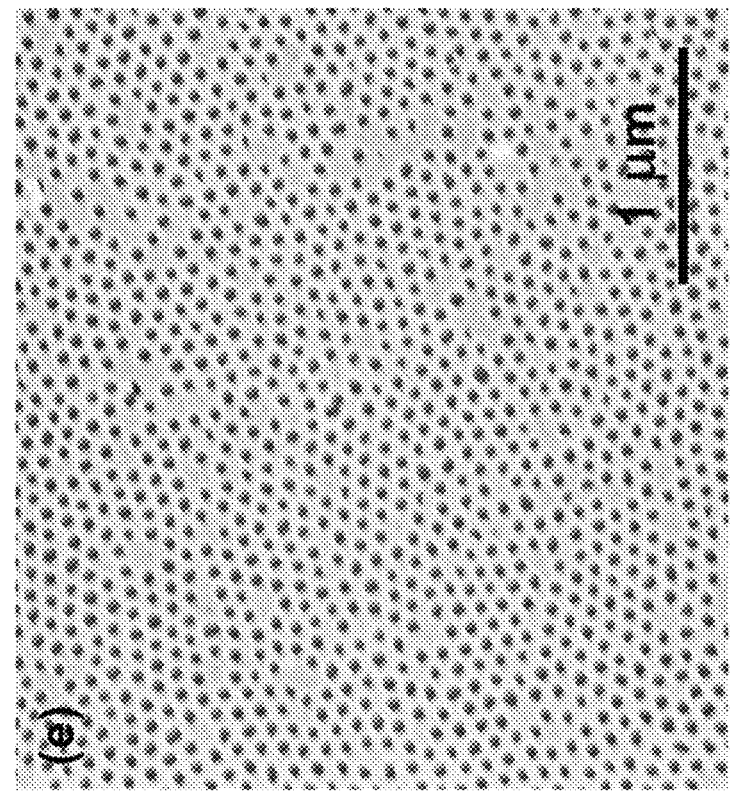

The scanning electron microscope (SEM) images in FIGS. 17A-17F further confirm the oligomer infusion mechanism. FIG. 17A and FIG. 17B show the top-view and cross-sectional view of a templated polyacrylate nanoporous AR coating consisting of 110 nm nanopores. After PDMS oligomer infusion, the SEM images in FIG. 17C and FIG. 17D reveal that the nanopores were mostly filled up. After hexane wash, the SEM images in FIG. 17E and FIG. 17F demonstrate the recovery of the original nanoporous structure of the original sample.

Ratios, concentrations, amounts, and other numerical data may be expressed in a range format. It is to be understood that such a range format is used for convenience and brevity, and should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1% to about 5%, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figure of the numerical value. In addition, the phrase "about 'x' to 'y'" includes "about 'x' to about 'y'".

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Embodiments of the present disclosure will employ, unless otherwise indicated, techniques of separating, testing, and constructing materials, which are within the skill of the art. Such techniques are explained fully in the literature.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method of tuning a tunable polymer membrane, comprising:
   providing a tunable polymer membrane;
   tuning the tunable polymer membrane with a first tuning method, thereby facilitating a first optical transition of the tunable polymer membrane to a first tuning state,
   tuning the tuned polymer membrane with a second tuning method, thereby facilitating a second optical transition to a second tuning state, wherein the first tuning method is an application of a force to a surface of the tunable polymer membrane,
   wherein the application of the force is with a stamp comprising an uncured oligomer configured to diffuse to the tunable polymer membrane upon the application of force with the stamp on the tunable polymer membrane.

2. The method of claim 1, wherein the first optical transition is transparent to opaque.

3. The method of claim 1, wherein the second tuning method is washing the tunable polymer membrane with a solvent, and the second optical transition is opaque to transparent.

4. The method of claim 1, further comprising initiating a tuning cycle wherein the first tuning state, second tuning state, or both are cycled for more than one cycle.

5. The method of claim 4, wherein the tuning cycle alters an optical transmission of the tunable membrane from a first optical transmission of below 94% to a second optical transmission above 98% or from a first optical transition of above 98% to a second optical transmission of below 94%.

6. The method of claim 1, wherein the stamp is a PDMS stamp comprising uncured PDMS oligomers.

7. The method of claim 1, wherein the first tuning method is applying a force to a surface of the tunable polymer membrane or washing the tunable polymer membrane with a solvent.

8. The method of claim 1, wherein the second tuning method is applying a force to a surface of the tunable polymer membrane or washing the tunable polymer membrane with a solvent.

9. The method of claim 1, wherein the first tuning method and second tuning method are different.

10. The method of claim 8, wherein the solvent is ethanol or hexane.

* * * * *